(12) United States Patent
Venuraju et al.

(10) Patent No.: US 10,467,316 B2
(45) Date of Patent: *Nov. 5, 2019

(54) SYSTEMS AND METHODS FOR WEB ANALYTICS TESTING AND WEB DEVELOPMENT

(71) Applicant: Capital One Services, LLC, McLean, VA (US)

(72) Inventors: Mithra Kosur Venuraju, Frisco, TX (US); Satish Chikkaveerappa, McKinney, TX (US); Amit Ramesh Deshpande, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/805,405

(22) Filed: Nov. 7, 2017

(65) Prior Publication Data

US 2019/0114364 A1 Apr. 18, 2019

Related U.S. Application Data

(63) Continuation of application No. 15/783,139, filed on Oct. 13, 2017, now Pat. No. 10,135,936.

(51) Int. Cl.
G06F 16/955 (2019.01)
G06F 8/77 (2018.01)
(Continued)

(52) U.S. Cl.
CPC .............. G06F 16/955 (2019.01); G06F 8/77 (2013.01); G06F 11/3428 (2013.01);
(Continued)

(58) Field of Classification Search
CPC ......... H04L 67/20; H04L 67/22; H04L 67/02; G06F 16/955; G06F 11/3664;
(Continued)

(56) References Cited

U.S. PATENT DOCUMENTS 8,006,187 B1\* 8/2011 Bailey .................... G06Q 10/10
715/733
8,386,314 B2\* 2/2013 Kirkby ................... G06Q 10/10
705/14.42
(Continued)

FOREIGN PATENT DOCUMENTS

WO WO 2017/136755 A1 8/2017

OTHER PUBLICATIONS

European Search Report and Written Opinion dated Aug. 2, 2019, in counterpart European Application No. 18200141.2 (8 pages.).

Primary Examiner — Ramy M Osman
(74) Attorney, Agent, or Firm — Finnegan, Henderson Farabow, Garrett & Dunner, LLP

(57) ABSTRACT

A computer system for analyzing page tags of a website. The system may include a processor in communication with a database; and a storage medium. The storage medium may store instructions that, when executed, configure the processor to: access the website, the website comprising plurality of page tags; generate a collected tag record by aggregating the page tags, the collected tag record comprising collected elements; request, from the database, a benchmark tag record, the benchmark record comprising benchmark elements, the benchmark tag record being based on historic page tags stored in the database; generate a result tag record, the result tag record indicating at least one of matches or mismatches between the benchmark tag record and the collected tag record; and display at least one of the result tag record or an analysis result, the analysis result representing an aggregation of the result.

17 Claims, 14 Drawing Sheets

(51) Int. Cl.
*H04L 29/08* (2006.01)
*G06F 16/48* (2019.01)
*G06F 16/81* (2019.01)
*G06F 16/958* (2019.01)
*G06F 11/34* (2006.01)
*G06F 11/36* (2006.01)

(52) U.S. Cl.
CPC ...... *G06F 11/3664* (2013.01); *G06F 11/3692* (2013.01); *G06F 16/48* (2019.01); *G06F 16/81* (2019.01); *G06F 16/958* (2019.01); *H04L 67/22* (2013.01); *G06F 2201/865* (2013.01); *G06F 2201/875* (2013.01); *H04L 67/02* (2013.01)

(58) Field of Classification Search
CPC ............. G06F 11/3692; G06F 11/3428; G06F 16/958; G06F 16/48; G06F 16/81; G06F 8/77; G06F 2201/865; G06F 2201/875; G06Q 10/06393
See application file for complete search history.

(56) References Cited

U.S. PATENT DOCUMENTS

| | | | |
|---|---|---|---|
| 10,135,936 B1* | 11/2018 | Venuraju | H04L 67/22 |
| 2009/0006478 A1* | 1/2009 | Rikhtverchik | G06Q 30/02 |
| 2011/0035486 A1* | 2/2011 | Seolas | H04L 43/0876 |
| | | | 709/224 |
| 2012/0005257 A1* | 1/2012 | Narayanan | G06F 16/958 |
| | | | 709/203 |
| 2013/0205020 A1* | 8/2013 | Broda | H04L 67/42 |
| | | | 709/224 |
| 2013/0246950 A1* | 9/2013 | Freestone | G06F 3/0482 |
| | | | 715/765 |
| 2014/0149577 A1* | 5/2014 | Monighetti | H04L 67/22 |
| | | | 709/224 |
| 2014/0244571 A1* | 8/2014 | Error | G06F 3/04842 |
| | | | 707/603 |
| 2014/0280012 A1 | 9/2014 | Feuerlein et al. | |
| 2015/0302052 A1 | 10/2015 | Galarneau et al. | |
| 2016/0048602 A1 | 2/2016 | Yastrebenetsky et al. | |
| 2017/0093917 A1* | 3/2017 | Chandra | H04L 67/22 |
| 2018/0046637 A1* | 2/2018 | Koopman | H04L 67/22 |
| 2018/0285921 A1* | 10/2018 | Levine | H04L 67/22 |

* cited by examiner

SYSTEMS AND METHODS FOR WEB ANALYTICS TESTING AND WEB DEVELOPMENT

CROSS-REFERENCE TO RELATED APPLICATIONS

This application is a continuation of application Ser. No. 15/783,139, filed Oct. 13, 2017, issued as U.S. Pat. No. 10,135,936. The disclosure of the above-referenced application is expressly incorporated herein by reference to its entirety.

TECHNICAL FIELD

The present disclosure relates generally to systems and methods for web analytics testing and software development, and more particularly to an automated system for page tag testing and analysis.

BACKGROUND

Web analytics is the measurement, collection, analysis, and reporting of web data. Web analytics was originally developed to monitor web data by analyzing log files or by inserting small scripts or page tags that track activity. For example, in some web analytics techniques, a small Javascript code or "cookie" may be associated with a website to collect variables such as time spent on a site or the identity of an originating website. Web analytics techniques, however, are no longer merely used to monitor web data. Nowadays, web analytics are also actively used to support web development projects.

Web development and software engineering is an increasingly complex activity. Current projects are large and intricate, may require multiple versions or iterations (often being developed in parallel), and may be developed by multiple teams that independently work on specific features. It is not unusual for major web development efforts to experience delays or failures caused by, for example, unexpected interactions between website features. To face these complexities and guarantee accurate control of the project, developers have turned to web analytics to help monitor the status of a project, compare different iterations, and evaluate the effect of new features in the overall user experience. For example, during web development page tags may be used to monitor whether buttons and links are working properly. Also, a page tag may track whether a login is successful when a user inputs accurate credentials and the loading time of a website. This incorporation of web analytics or metadata analysis in web development has helped developers and managers to monitor projects.

Nowadays, however, projects scale very quickly and the vast amount of page tags or metadata associated with a website often prevents their effective analysis or use during development. For example, it is common to have hundreds or even thousands of page tags associated with a website. Developers and managers must now invest massive resources to monitor these page tags during development. Indeed, analyzing page tags associated with a large website may stress computer resources because parsing and filtering tasks are performed in very large data sets, making the analysis processes slow and inefficient. Further, monitoring page tags often require multiple iterations of analysis for each sprint/regression cycle. In some situations the analysis of the page tags may create bottle necks in the development process significantly delaying a project. The increasing large amount and complexity of page tags that are associated with a website, can render the use of web analytics techniques impractical during development, and post-development evaluation.

The disclosed systems and methods address one or more of the problems set forth above and/or other problems in the prior art.

SUMMARY

One aspect of the present disclosure is directed to a computer system for analyzing page tags of a website. The system may include a processor in communication with a database; and a storage medium storing instructions that, when executed, configure the processor to: access the website, the website may include a plurality of page tags; generate a collected tag record by aggregating the page tags, the collected tag record may include collected elements; request, from the database, a benchmark tag record, the benchmark record may include benchmark elements, the benchmark tag record being based on historic page tags stored in the database; generate a result tag record, the result tag record indicating at least one of matches or mismatches between the benchmark tag record and the collected tag record; and display at least one of the result tag record or an analysis result, the analysis result representing an aggregation of the result record.

Another aspect of the present disclosure is directed a non-transitory computer-readable medium storing instructions. When executed the instructions may cause a processor to operate a computer system for analyzing page tags of a website by performing operations. The operations may include accessing the website, the website may include a plurality of page tags; generating a collected tag record by aggregating the page tags, the collected tag record may include collected elements; requesting, from a database, a benchmark tag record, the benchmark tag record may include benchmark elements, the benchmark tag record being based on historic page tags stored in the database; generating a result tag record, the result tag record indicating at least one of matches or mismatches between the benchmark tag record and the collected tag record; displaying at least one of the result tag record or an analysis result, the analysis result representing an aggregation of the result record.

Yet another aspect of the present disclosure is directed to a computer-implemented method for analyzing page tags of a website. The method may include accessing a website, the website may include plurality of page tags; generating a collected tag record by aggregating the page tags, the collected tag record may include collected elements; requesting, from a database, a benchmark tag record, the benchmark tag record may include benchmark elements, the benchmark tag record being based on historic page tags stored in the database; generating a result tag record, the result tag record indicating at least one of matches or mismatches between the benchmark tag record and the collected tag record; display at least one of the result tag record or an analysis result, the analysis result representing an aggregation of the result record.

Another aspect of the present disclosure is directed to a computer system for analyzing page tags of a website. The system may include a processor; and a storage medium storing instructions that, when executed, configure the processor to: receive a web address from a modified web browser, the modified web browser may include a page tag capturing module; access a website associated with the web address via the modified web browser; generate a collected page tag record using the page tag capturing module, the collected page tag record including a plurality of collected tags; receive, from the modified web browser, a probe tag, the probe tag may include a probe identification; determine whether the probe tag is included in the collected page tag record; and display a coded list may include the collected tags, the coded list associating collected tags with graphical icons, the graphical icons representing whether collected properties match the probe tag.

Yet another aspect of the present invention is directed to a non-transitory computer-readable medium storing instructions that, when executed by a processor, cause the processor to operate a computer system for analyzing page tags of a website by performing operations. The operations may include receiving a web address from a modified web browser, the modified web browser may include a page tag capturing module; accessing a website associated with the web address via the modified web browser; generating a collected page tag record using the page tag capturing module, the collected page tag record may include a plurality of collected tags associated with collected properties; receiving, from the modified web browser, a probe tag, the probe tag may include a probe identification; determining whether the probe tag is included in the collected page tag record; and displaying a coded list may include the collected tags, the coded list associating collected tags with graphical icons, the graphical icons representing whether collected properties match the probe tag.

Another aspect of the present invention is directed to a computer-implemented method for analyzing page tags of a website. The method may include receiving a web address from a modified web browser, the modified web browser may include a page tag capturing module; accessing a website associated with the web address via the modified web browser; generating a collected page tag record using the page tag capturing module, the collected page tag record may include a plurality of collected tags associated with collected properties; receiving, from the modified web browser, a probe tag, the probe tag may include a probe identification; determining whether the probe tag is included in the collected page tag record; and displaying a coded list may include the collected tags, the coded list associating collected tags with graphical icons, the graphical icons representing whether collected properties match the probe tag.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The disclosure is generally directed to a system that facilitates analysis of page tags associated with websites, and creates a secure implementation of changes. Page tags may include different forms of metadata associated with websites. For example, page tags may include HTML Meta Tags, including title, description, or keywords.

In some embodiments, the system may be arranged with local, mobile, and supervisor subsystems. These subsystems may be configured to automatically monitor page tags, compare page tags, and generate reports. In addition, to simplify page tag collection and testing, a developer in one of the subsystems may test a website by automatically running a plurality of scenarios. For each scenario the subsystem may capture multiple page tags which are then compared to a database of page tags. To improve speed and accuracy when comparing page tags, subsystems may utilize routines designed to improve the computer functionality by utilizing dedicated hardware or specific functions. Additionally or alternatively, subsystems may generate codified reports that describe the overlap of benchmark and collected tags and provide a probability of success or failure. The system may additionally be used to coordinate changes executed in a master server. In some embodiments, new features or changes are only implemented after a supervisor subsystem issues a key to provide access to a master server. In alternative or additional embodiments, the system may be configured so only a supervisor subsystem can contact a master server to minimize errors and have accurate control over a project. These arrangements create a robust system to automatically analyze page tags in multiple points on development and use them to coordinate changes to a website or software.

In addition, in some embodiments the system may employ a modified web browser to analyze the page tags on a developed website. The analysis may be based on receiving a probe tag that is compared against, or searched in, a plurality of collected page tags that are associated with a website that is accessed through the modified web browser.

Reference will now be made in detail to the disclosed embodiments, examples of which are illustrated in the accompanying drawings.

Figure 1:
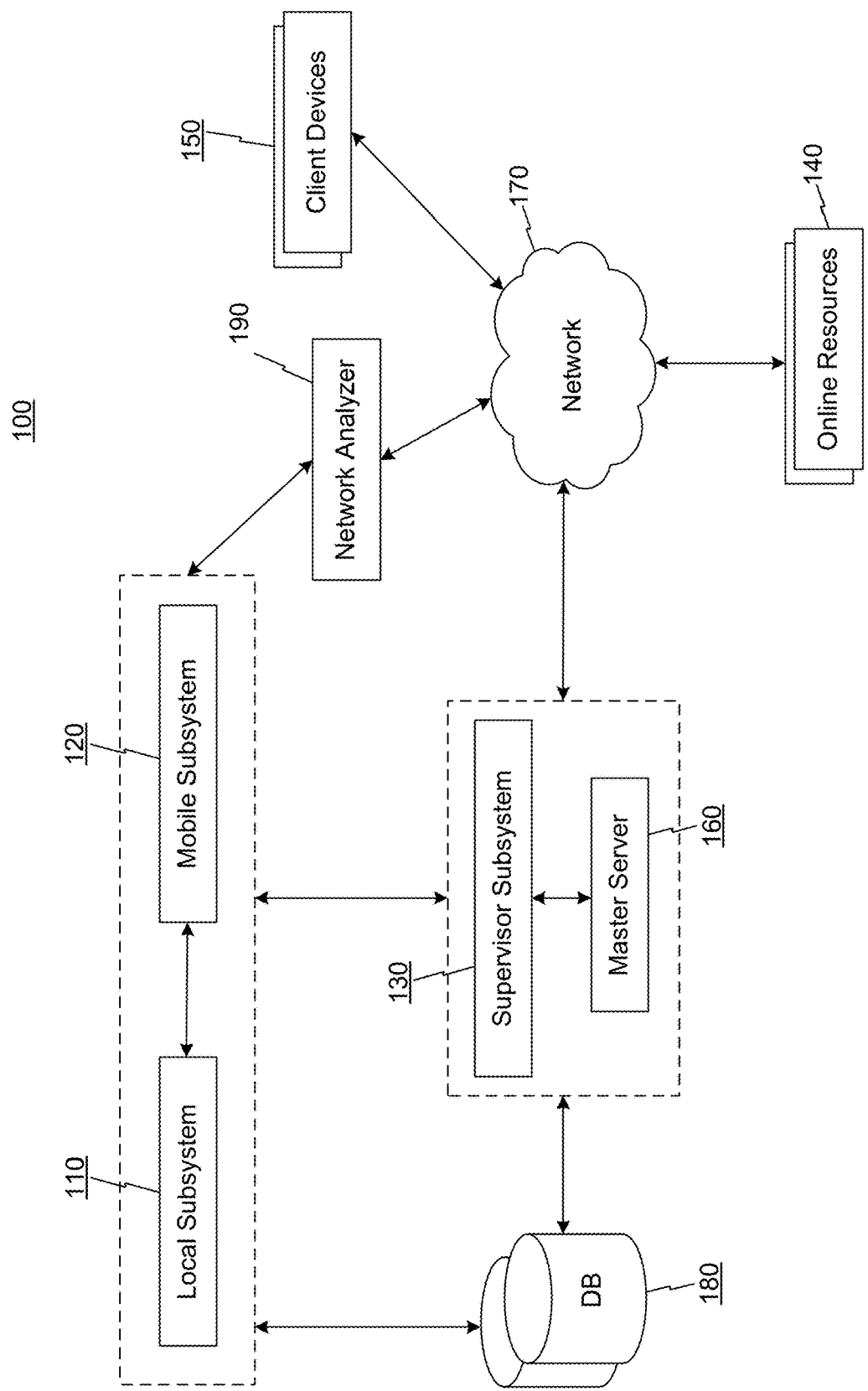
FIG. 1 is a block diagram of an exemplary system, consistent with disclosed embodiments.

FIG. 1 is a block diagram of an exemplary system 100, consistent with disclosed embodiments. System 100 may be used to automatically analyze page tags of a website and implement changes to the website, consistent with disclosed embodiments. System 100 may include a local subsystem 110, a mobile subsystem 120, supervisor subsystem 130, Online resources 140, client devices 150, master server 160, databases 180, network analyzer 190. In some embodiments, as shown in FIG. 1, some components of system 100 may be connected to a network 170. However, in other embodiments components of system 100 may be connected directly with each other, without network 170.

Local subsystem 110 may be a system associated with an online content provider. For example, local subsystem 110 may be associated with an entity that generates, provides, manages, tests, and/or maintains websites and websites. Local subsystem 110 may store information about a website; for example, it may include storage devices that comprise source code and other types of website information known to those skilled in the art. Local subsystem 110 may include infrastructure and components that are configured to generate and test websites. For example, local subsystem 110 may include computer processors that compile websites and databases storing web data. Additional elements of local subsystem 110 will be described with respect to FIG. 2.

Mobile subsystem 120 may include similar components to those of local subsystem 110, having components to generate, provide, manage, test, and/or maintain websites. However, mobile subsystem 120 may be dedicated to testing mobile applications. For example, mobile subsystem 120 may include components specifically configured to emulate Android and/or iOS environments. In some embodiments, mobile subsystem 120 may include a website resizer or mobile device tester.

FIG. 1 shows local subsystem 110 and mobile subsystem 120 as different components. For example, local subsystem 110 and mobile subsystem 120 may be in independent physical locations. However, local subsystem 110 and mobile subsystem 120 may be implemented in the same computing system. For example, local subsystem 110 and mobile subsystem 120 may be embodied in a single server.

Online resources 140 may include one or more servers or storage services provided by an entity such as a provider of website hosting, networking, cloud storage, or backup services. In some embodiments, online resources 140 may be associated with hosting services or servers that store other websites. In other embodiments, online resources 140 may be associated with a cloud computing service such as Microsoft Azure™ or Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as defective page tags or unsuccessful loadings.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device. Client devices 150 may include one or more processors configured to execute software instructions stored in memory, such as memory included in client devices 150. Client devices 150 may include software that when executed by a processor performs known Internet-related communication and content display processes. For instance, client devices 150 may execute browser software that generates and displays interfaces including content on a display device included in, or connected to, client devices 150. Client devices 150 may execute applications that allows client devices 150 to communicate with components over network 170, and generate and display content in interfaces via display devices included in client devices 150. The disclosed embodiments are not limited to any particular configuration of client devices 150. For instance, a client device 150 may be a mobile device that stores and executes mobile applications that provide functions offered by master server 160 and/or online resources 140. In certain embodiments, client devices 150 may be configured to execute software instructions relating to location services, such as GPS locations. For example, client devices 150 may be configured to determine a geographic location and provide location data and time stamp data corresponding to the location data.

Master server 160 may include one or more computing systems, such as servers, that are configured to execute stored software instructions to perform operations associated with providing a website to client devices 150, including one or more processes associated with displaying websites, accepting login credentials, receiving requests (e.g., a request for additional websites), information from cookies that are store in client devices 150, etc.

In some embodiments, as shown in FIG. 1, the master server 160 can only be accessed through a supervisor subsystem. However, in other embodiments local subsystem 110 and mobile subsystem 120 may directly access the master server 160. In such embodiments, master server 160 may be configured to request an access key from local subsystem 110 or mobile subsystem 120 before changes are implemented.

In some embodiments, local subsystem 110 and mobile subsystem 120 may be connected to databases 180. In such embodiments, databases 180 may include a communication device that sends information to local subsystem 110, mobile subsystem 120, and supervisor subsystem 130. In some embodiments, anytime database 180 sends information to the local subsystem 110 or the mobile subsystem 120, a copy of the exchange may be submitted to supervisor subsystem 130. In such embodiments, supervisor subsystem 130 may have a fraud or risk detection module that captures abnormal behavior. For example, if the fraud or risk detection module detect that a the local subsystem 110 is requesting an abnormal amount of information from database 180, supervisor system 130 may stop or overrule requests from the local subsystem to prevent system malfunctioning. In this way, supervisor subsystem 130 may identify distributed attacks that target to affect the appropriate functioning of system 100.

Databases 180 may include one or more computing devices configured with appropriate software to perform operations consistent with providing local subsystem 110, mobile subsystem 120, and supervisor subsystem 130 with data required for page tag analysis. Databases 180 may include, for example, Oracle™ databases, Sybase™ databases, or other relational databases or non-relational databases, such as Hadoop™ sequence files, HBase™, or Cassandra™ Databases 180 may include computing components (e.g., database management system, database server, etc.) configured to receive and process requests for data stored in memory devices of the databases and to provide data from the databases.

Network 170 may be any type of network configured to provide communications between components of system 100. For example, network 170 may be any type of network (including infrastructure) that provides communications, exchanges information, and/or facilitates the exchange of information, such as the Internet, a Local Area Network, a near field communication (NFC) device, an optical code scanner, or other suitable connections or components that enable the sending and receiving of information between the components of system 100. In other embodiments, one or more components of system 100 may communicate directly through a dedicated communication link(s).

Network analyzer 190 may be a software or hardware device or system used to measure parameters and data packages of a network. For example, in some embodiments network analyzer 190 may include a packet analyzer which may capture the structure or encapsulation of different networking protocols. In such embodiments, network analyzer 190 may parse and display the fields along with their meanings as specified by different networking protocols. For example, network analyzer 190 may be configured to capture and segment TCP/IP packets.

Network analyzer 190 may be configured to capture information transmitted from network 170 to client devices 150, to local subsystem 110, or to mobile subsystem 120. In such embodiments, network analyzer 190 may be configured to capture page tags associated with a website. For example, when browser application programming interface (API) 240 in local subsystem 110 accesses a website, network analyzer 190 may capture the packets sent from the browser API 240 to the network 170. Network analyzer 190 may also specifically detect or identify packets that are related to page tags by, for example, filtering the captured packets using parameters such as header or value. Network analyzer may also capture the response of the network 170 directed to local subsystem 110. For example, network analyzer 190 may capture packets going from an online resource 140 through network 170 to respond to local subsystem 110. Network analyzer may also filter the captured packets to identify page tags.

Network analyzer 190 may be configured to capture tags based on keywords associated with the page tag. For example, network analyzer may search for page tags associated with: Page Title; Meta Description; Authorship Markup; OpenGraph tags; and Twitter Cards, among others.

Figure 2:
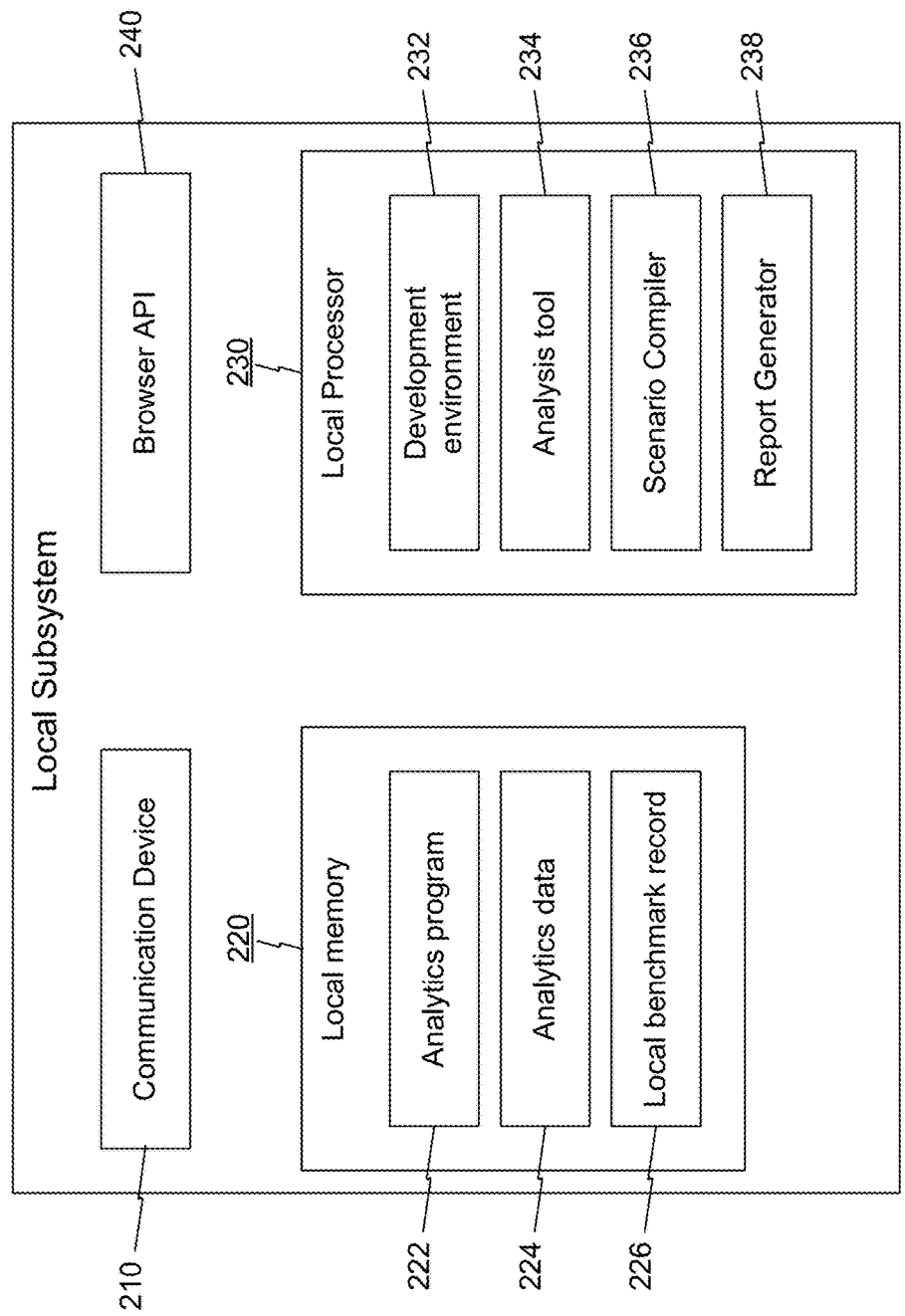
FIG. 2 is a block diagram of an exemplary local subsystem, consistent with disclosed embodiments.

While FIG. 1 shows network analyzer being a different element from local subsystem 110, in some embodiments network analyzer 190 may be implemented in processors of local subsystem 110. For example, network analyzer 190 may be implemented by local processor 230 (FIG. 2). However, in other embodiments, network analyzer 190 may be implemented in with specialized hardware. For example, network analyzer 190 may be an instrument with two ports, an input and an output, that is connected between elements of system 100. As shown in FIG. 1 network analyzer may bridge network 170 with local subsystem 110 and mobile subsystem 120. Having specialized hardware to analyze the network packages may have advantages, particularly given the large amount of data that is exchanged between network 170 and subsystems 110 and 120. For example, if the amount of data between elements is very large, specialized hardware that stores and sorts the captured packages may improve the computer functioning by discretizing functions with embedded systems.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

FIG. 2 is a block diagram of an exemplary local subsystem 110, consistent with disclosed embodiments. Local subsystem 110 may include a communication device 210, a local memory 220, a browser API 240, and one or more local processors 230. Local memory 220 may include an analytics programs 222, an analytics data 224, and a local benchmark record 226. Local processor 230 may include a development environment 232, an analysis tool 234, a scenario compiler 236, and a report generator 238.

In some embodiments, local subsystem 110 may take the form of a server, general purpose computer, mainframe computer, or any combination of these components. However, in other embodiments, local subsystem 110 may include multiple discrete hardware components connected in a local network. For example, analysis tool 234 may be an field-programmable gate array (FPGA) specifically configured to analyze page tags, while local processors 230 may be a multiple-core CPU. In addition, other implementations consistent with disclosed embodiments are possible as well.

Communication device 210 may be configured to communicate with one or more databases, such as databases 180 described above. In particular, communication device 210 may be configured to receive associated page tags from database 180. In addition, communication device 210 may be configured to communicate with other components as well, including, for example, supervisor subsystem 130, master server 160, and/or mobile subsystem 120.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Local memory 220 may include one or more storage devices configured to store instructions used by local processor 230 to perform functions related to disclosed embodiments. For example, local memory 220 may store software instruction modules, such as analytics program 222, that may perform one or more operations when executed by local processor 230. The disclosed embodiments are not limited to separate programs or computers configured to perform dedicated tasks. For example, local memory 220 may include a single analytics program 222 that performs the functions of Local subsystem 110, or analytics program 222 may comprise multiple programs. Local memory 220 may also store analytics data 224 that is used by analytics program(s) 222.

In certain embodiments, local memory 220 may store sets of instructions for carrying out processes to analyze page tags, generate a page tag report, and/or compare bench mark records with a test results, as described below in connection with FIGS. 6-8. In certain embodiments, local memory 220 may store sets of instructions for publishing graphical results, such as the ones described below in connection with FIGS. 13 and 14. Other instructions are possible as well. In general, instructions may be executed by local processor 230 to perform one or more processes consistent with disclosed embodiments.

In some embodiments, local memory 220 may include a local benchmark record 226. The local benchmark record may include page tags that are expected to be present in a given scenario for a given website. For example, local benchmark record 226 may include a plurality of page tags that are associated with accessing a websites. Each local benchmark record may include benchmark elements, which may represent each of the page tags that are expected to be collected when accessing a websites. Thus, in such embodiments, a local benchmark record has a collection of page tags that are expected in the website. Benchmark elements may be stored by a user in local benchmark record by collecting the tags of a working version of the website. For example, when a user determines that a website is working properly, it may collect the page tags associated with the website version and store them as the benchmark. Following iterations on the website may use the benchmark tag record to evaluate the effect on page tags by comparing the page tags recorded in a working version with the page tags collected in the modified version.

In some embodiments, local processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, local processor 230 may be a plurality of devices coupled and configured to perform functions consistent with this disclosure.

Local processor 230 may include a development environment 232, an analysis tool 234, a scenario compiler 236, and a report generator 238. In some embodiments, local processor 230 may execute software to perform functions associated with each component of local processor 230. In other embodiments, each component of local processor 230 may be an independent device. In such embodiments, each component may be hardware configured to specifically process data or perform operations associated with page tag analysis, generating reports and/or handling test scenarios. For example, analysis tool 234 may be also include a Graphics processing unit (GPU), and scenario compiler 236 may be a central processing unit (CPU). Other hardware combinations are also possible. In yet other embodiments, combinations of hardware and software may be used to implement local processor 230.

Development environment 232 may run software for an acceptance test written in behavior-driven development (BDD) style. Development environment 232 may additionally include a plain language parser to allow certain scenarios to be specified in a local language that is easy to understand. For example, in some embodiments development environment 232 may run a software tool configured to test other software, such as Cucumber®, Capybara®, or Mocha™. In such embodiments, development environment 232 may be support a variety of programming languages through various implementations that facilitate BDD testing by running automated acceptance tests written in a BDD style. Further, development environment 232 may utilize a non-technical and human readable parser that describes use cases relating to a software system, such as a Gherkin®. In such embodiments, development environment 232 may include a plain language parser that delineate a script for automated testing.

In some embodiments, to setup a test, a user in development environment 232 may create a data format used for asynchronous browser/server communication. For instance, a user may create a Javascript Object Notation using, for example, new FileWriter(System.getProperty("userdir")+ "\\resources\\output1json." In such embodiments, human-readable text may be inputted in the development environment 232 to transmit data objects consisting of value Paris and array data types. For example, instructions may be transmitted with commands that include "keywords" such as "GIVEN" and "THEN" to describe an scenario. In some embodiments, the instructions in the development environment 232 may include:

Scenario: Validate web-analytics for website
Given | access the website
Then | validate site catalyst tag for website is working as expected
| TageName | Tag Value |

In some embodiments, development environment 232 may replace encoded data of the BDD style test using a string conversion. For example, in some embodiments, development environment 232 may execute a character-per-character conversion of UTF-8 encoded data. The conversion may result in a refined BDD style. Development environment 232 may then compare the human-readable instructions with the encoded data. When the human-readable instructions match the encoded data, development environment 232 may compile a testing scenario which is communicated to browser API 240. Browser API 240 may then execute the scenario and collect and store tags for each one of the scenarios.

In some embodiments, local processor 230 may implement development environment 232 by executing instructions to create a virtual environment in which the scenarios are inputted and compiled. In other embodiments, however, development environment 232 may be a separate device or group of devices. In such embodiments, development environment 232 may include hardware configured to effectively carry out parallel tasks to cover the greatest number of scenarios. For example, to improve performance and minimize costs, development environment 232 may be an SRAM-based FPGA that functions as development environment 232. Development environment 232 may have an architecture designed for implementation of specific algorithms. For example, development environment 232 may include a Simple Risc Computer (SRC) architecture or other reconfigurable computing system.

Local processor 230 may implement analysis tool 234 by executing software to create an environment for comparing collected and benchmark page tags. However, in other embodiments analysis tool 234 may include independent hardware with specific architectures to improve the efficiency of comparison and sorting processes. For example, analysis tool 234 may be a GPU array configured to sort collected page tags and compare them with the benchmark tags. In some embodiments, analysis tool 234 may be configured to implement sorting algorithms such as, for example, radix sort. Alternatively or additionally, analysis tool 234 may be configured to implement a programming interface, such as Apache Spark, and execute data structures, cluster managers, and/or distributed storage systems. For example, analysis tool 234 may include a resilient distributed dataset that is manipulated with a standalone software subsystem and/or a distributed file system.

Scenario compiler 236 may receive a scenario from development environment 232 to encode data for execution in browser API 240. For example, scenario compiler 236 receive testing scenarios and then compile them in parallel or sequence. Scenario compiler 236 may then arrange the testing scenarios based on similarity to organize them and make the process more efficient. For example, the scenario compiler 236 may determine the complexity of the scenarios and start with less complex scenarios and progressively compile more complex scenarios. In addition, scenario compiler 236 may detect similarities between scenarios and recycle the compiled instructions. For example, when multiple scenarios have the instruction "Given I access the website," scenario compiler 236 may improve the functioning of the computer by storing machine-readable instructions associated with such instructions to minimize the compiling time.

Scenario compiler 236 may be implemented by local processor 230. For example, local processor 230 may execute software to create an environment to execute models. However, in other embodiments scenario compiler 236 may include hardware configured to carry out parallel operations. Some hardware configurations improve the efficiency of calculations, particularly when multiple compilations are being processed in parallel. For example, scenario compiler 236 may include multicore processors or computer clusters to divide tasks and quickly compile testing scenarios. In some embodiments, developer environment 232 may be configured to generate series of testing scenarios with permutations of steps or different page tag values. In such embodiments, scenario compiler 236 may include a scheduling module. The scheduling module may receive testing scenarios, as specified by development environment 232 and assign an order of execution. In other embodiments, scenario compiler 236 may be implemented as FPGA arrays to provide greater performance and determinism.

Local processor 230 may additionally include report generator 238. Report generator may be implemented when local processor 230 executes instructions stored analytics program 222. However, in other embodiments, report generator 238 may be hardware specifically design to generate reports. As previously discussed, hundreds or even thousands of page tags may be associated with a website. Thus, it may be inefficient to merely report the status of each tag. Instead, report generator 238 may analyze results from analysis tool 234 and encode information to facilitate its exchange between subsystems in system 100. In some embodiments, report generator 238 may break results from analysis tool 234 into groups of page tags having a fixed number of bits. Then, report generator 238 may compute the exclusive or (XOR) of all those page tags to create a score. The score may then be reported to other subsystems as the results from a test run analyzed by analysis tool 234. Report generator 238 may also be configured to generate graphical data or a threshold score for the comparison of scores between the expected and collected data. In some embodiments, report generator 238 may classify page tags in level of criticality. For example, when a page tag associated with a login is critical, mismatches or errors in such page tag may be identified and presented in a "Failing" report. However, other page tags, such as loading time, may not be critical and only partially affect the report score. In yet other embodiments, report generator 238 may generate graphical reports.

The components of local subsystem 110 may be implemented in hardware, software, or a combination of both, as will be apparent to those skilled in the art. For example, although one or more components of local subsystem 110 may be implemented as computer processing instructions embodied in computer software, all or a portion of the functionality of local subsystem 110 may be implemented in dedicated hardware. For instance, groups of GPUs and/or FPGAs maybe used to quickly analyze data in local processor 230.

Figure 3:
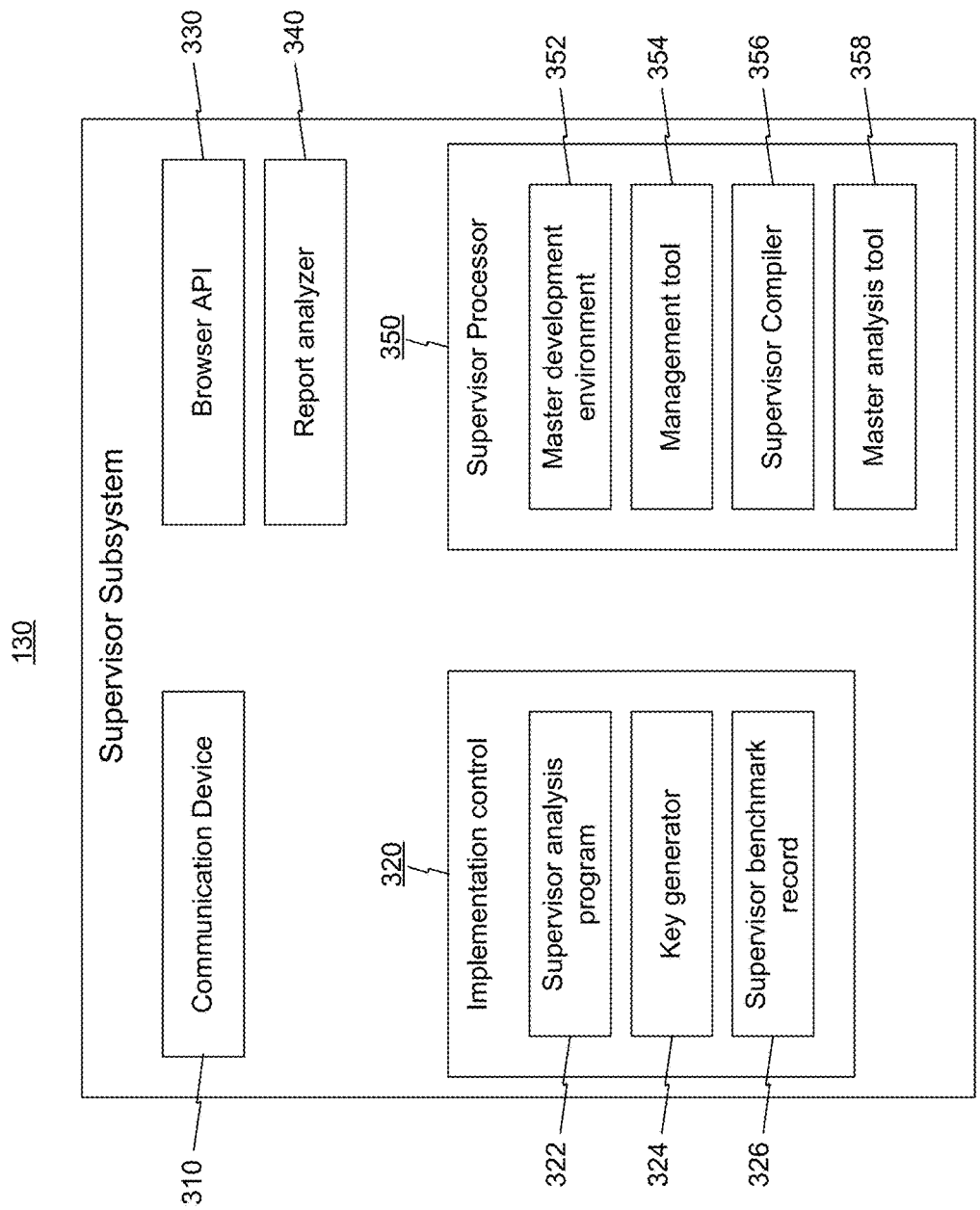
FIG. 3 is a block diagram of an exemplary supervisor system, consistent with disclosed embodiments.

FIG. 3 is a block diagram of an exemplary model generator, consistent with disclosed embodiments. Supervisor subsystem 130 may include an implementation control 320, a supervisor browser API 330, a report analyzer 340, a supervisor processor 350, and a communication device 310.

The complexity of web projects demands strict control on changes and new features that will be implemented. Particularly in collaborative environments, in which different groups work in parallel developing features, it becomes important to establish systems that control changes. Supervisor subsystem 130 of system 100 facilitates verifying and implementing new features and changes by creating an interface between developers and master server 160.

Similar to communication device 210, communication device 310 in supervisor subsystem 130 may be configured to communicate with databases 180, local subsystems 110, mobile subsystems 120, and master server 160. Communication device 310 may include, for example, one or more digital and/or analog devices that implement communication device 310 and other components, such as a network controller and/or wireless adaptor for communicating over the Internet. Other implementations consistent with disclosed embodiments are possible as well.

Supervisor subsystem 130 may include an implementation control 320. Implementation control 320 may include a processor and a memory that manages and configure a supervisor analysis program 322, a key generator 324, and a supervisor benchmark record 326.

Supervisor analysis program 322 may include instructions to perform web analytics testing on a website. For example, supervisor analysis program 322 may include a non-transitory memory device that stores a set of standardized testing scenarios. The standardized testing scenarios may include a set of scenarios that guarantee basic functioning of the website. For example, the standardized testing scenarios may include testing of basic website accessibility or accurate functioning of encryption processes.

Key generator 324 in supervisor subsystem 130 may be a module that generates a key, such as a serial number, that would be necessary to implement changes in master server 160. In some embodiments, key generator 324 may store a plurality of public key infrastructure (PKI) certificates that may be distributed to, for example, local subsystem 110 and mobile subsystem 120.

Supervisor benchmark record 326 in supervisor subsystem 130 may store a plurality of global benchmark tags. While local benchmark tags stored in database 180 or local benchmark record 226 may include information related to specific features in a website, global benchmark tags may record elements that are expected for interactions between different websites of the project. For example, supervisor benchmark record 326 may include benchmark page tags that relate links between websites, exchanges of information, and/or the number of events that is fired in the plurality of websites. The supervisor benchmark record is configured to coordinate and verify the events of multiple interactions.

Supervisor subsystem 130 may also include a supervisor processor 350 which may include a master development environment 352, a management tool 354, a supervisor compiler 356, and a master analysis tool 358.

Master development environment 352 may be similar to development environment 232, but be configured to develop setup scenarios that test multiple websites.

Supervisor compiler may similarly compile information test scenarios and send them to supervisor browser API 330 for execution. The resulting page tags may then be compared against page tags recorded in the supervisor benchmark record 326. Results may be analyzed by master analysis tool 358 that then may accept or reject new features and changes from the local subsystem 110.

In some embodiments, supervisor subsystem 130 may analyze a report from local subsystem 110 using a report analyzer. In such embodiments, supervisor subsystem 130 may accept or discard changes based only on the report results. For example, if the report result indicates there are no faulty page tags, supervisor subsystem 130 may immediately implement changes. In other embodiments, however, supervisor subsystem 130 may run a new test before applying changes. For instance, supervisor subsystem 130 may use master analysis tool 358 perform an additional analysis before implementing the website changes.

When the supervisor subsystem 130 determines that the changes or new features may be implemented, whether based on the master analysis tool results or the report analyzer, it may instruct key generator 324 to generate a key for local subsystem 110 that would enable local subsystem 110 to execute the changes. However, in alternative embodiments, supervisor subsystem 130 may override key generation steps and directly implement changes, communicating with the master server 160.

In some embodiments, supervisor processor 350 may also include a management tool 354 that tracks and records events and changes in the supervisor subsystem 130. For example, management tool 354 may record the number of changes performed or store interactions between databases 180, local subsystem 110 and mobile subsystem 120.

Figure 4:
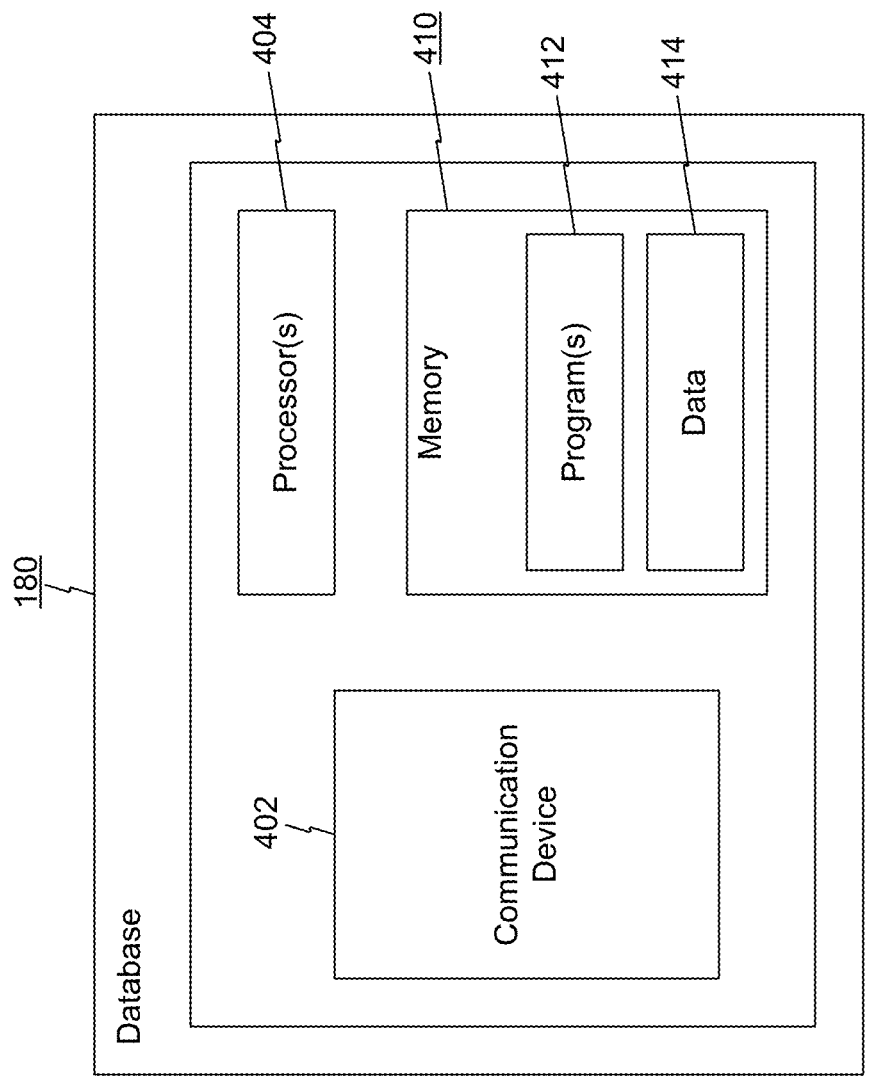
FIG. 4 is a block diagram of an exemplary database, consistent with disclosed embodiments.

FIG. 4 is a block diagram of an exemplary database 180, consistent with disclosed embodiments. Database 180 may include a communication device 402, one or more database processors 404, and a database memory 410 including one or more database programs 412 and data 414.

In some embodiments, databases 180 may take the form of servers, general purpose computers, mainframe computers, or any combination of these components. Other implementations consistent with disclosed embodiments are possible as well.

Communication device 402 may be configured to communicate with one or more components of system 100, local subsystem 110, mobile subsystem 120, and/or supervisor subsystem 130. In particular, communication device 402 may be configured to provide to local subsystem 110 and mobile subsystem 120 data associated with page tags or associated metadata.

Communication device 402 may be configured to communicate with other components as well, including, for example, supervisor subsystem 130 and master server 160, and one or more online resources 140. Communication device 402 may take any of the forms described above for communication device 210.

Database processors 404, database memory 410, database programs 412, and data 414 may take any of the forms described above for local processors 230 and local memory 220, respectively. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 414 may be data associated with specific websites. For example, data 414 may include groups of benchmark page tags and include information associated with a plurality of websites. Data 414 may include, for example, a feature vector for each website. The feature vector may include a website ID, a plurality of benchmark page tags for the website, and a weighting associated with each benchmark. Data 414 may describe functions or expected behavior of the website. For example, data 414 may indicate expected loading time of the website.

Figure 5:
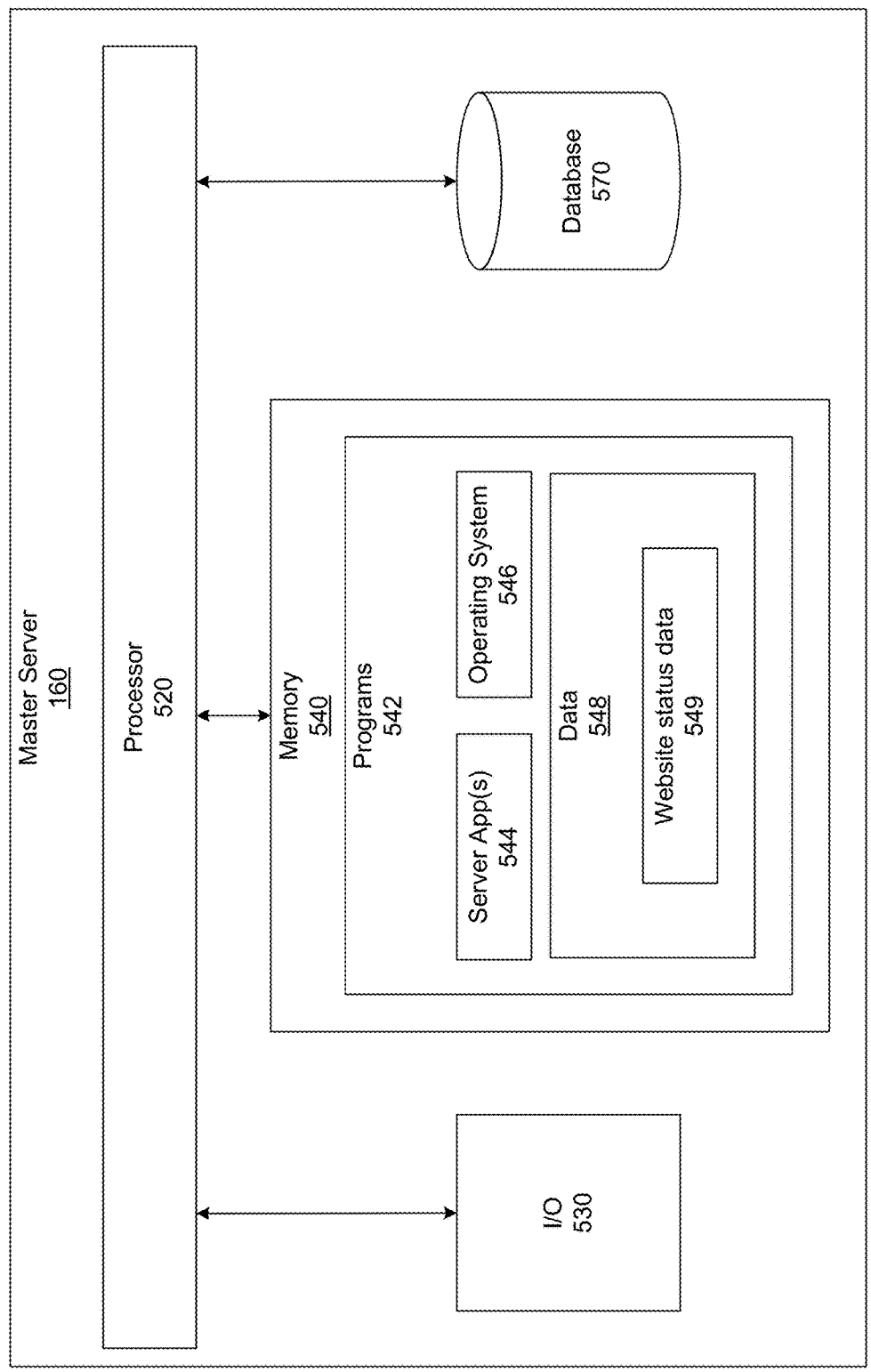
FIG. 5 is a block diagram of an exemplary master server, consistent with disclosed embodiments.

FIG. 5 is a block diagram of an exemplary master server 160, consistent with disclosed embodiments. In some embodiments, master server 160 may support or provide a cloud computing service, such as Microsoft Azure™ or Amazon Web Services™. In such embodiments, master server 160 may include one or more distributed computer systems capable of performing distributed computing functions and providing cloud computing services and functions consistent with disclosed embodiments. In some embodiments, master server 160 may operate in conjunction with supervisor subsystem 130. In other embodiments, master server 160 may operate alone. In such embodiments, master server 160 may perform all functions associated with the disclosed methods.

As shown in FIG. 5, master server 160 may include one or more processor(s) 520, input/output ("I/O") devices 530, a memory 540 storing programs 542 (including, for example, server app(s) 544 and operating system 546) and data 548 (including website status data 549), and a server database 570. Master server 160 may be a single server or may be configured as a distributed computer system including multiple servers or computers that interoperate to perform one or more of the processes and functionalities associated with the disclosed embodiments.

Processor(s) 520 may be one or more known computing devices, such as those described with respect to processor 230 in FIG. 2.

In some embodiments, master server 160 may also include one or more I/O devices 530 including interfaces for receiving signals or input from devices and for providing signals or output to one or more devices that allow data to be received and/or transmitted by master server 160. For example, master server 160 may include interface components, which may provide interfaces to one or more input devices, such as one or more keyboards, mouse devices, and the like, that enable master server 160 to receive input from users associated with system 100.

In some embodiments, master server 160 may include one or more storage devices configured to store information used by processor 520 (or other components) to perform certain functions related to the disclosed embodiments. In one example, master server 160 may include memory 540 that includes instructions to enable processor 520 to execute one or more applications, such as server applications, an electronic transaction application, an account status application, network communication processes, and any other type of application or software known to be available on computer systems. Alternatively or additionally, the instructions, application programs, etc, may be stored in an internal database 570 or databases 180 (shown in FIG. 1) in communication with master server 160, such as one or more database or memory accessible over network 170. Database 570 or other external storage may be a volatile or non-volatile, magnetic, semiconductor, tape, optical, removable, non-removable, or other type of storage device or tangible (i.e., non-transitory) computer-readable medium.

In one embodiment, master server 160 may include memory 540 which includes instructions that, when executed by processor 520, perform one or more processes consistent with the functionalities disclosed herein. Methods, systems, and articles of manufacture consistent with disclosed embodiments are not limited to separate programs or computers configured to perform dedicated tasks. For example, master server 160 may include memory 540 that may include one or more programs 542 to perform one or more functions of the disclosed embodiments. Moreover, processor 520 may execute one or more programs that may be displayed in client devices 150.

Programs 542 stored in memory 540 and executed by processor(s) 520 may include one or more server app(s) 552 and an operating system 546. Server app(s) 552 may incorporate one or more apps configured to receive and process requests from online resources 140 or client devices 150.

In some embodiments, memory 540 may store data 548 including website status data associated with websites, client information, or authentication information. For example, data 548 may associate users identifications with passwords. Data 548 may also include information about page tags store in client devices 150. For the purpose of this application, procedures is not limited to a medical procedure and may include multiple tasks that may be performed by an online provider.

In some embodiments, memory 540 and database 570 may include one or more memory devices that store data and instructions used to perform one or more features of the disclosed embodiments. Memory 540 and database 570 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Master server 160 may communicate with one or more remote memory devices (e.g., databases 180). The remote memory devices may be configured to store information and may be accessed and/or managed by master server 160. By way of example only, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Figure 6:
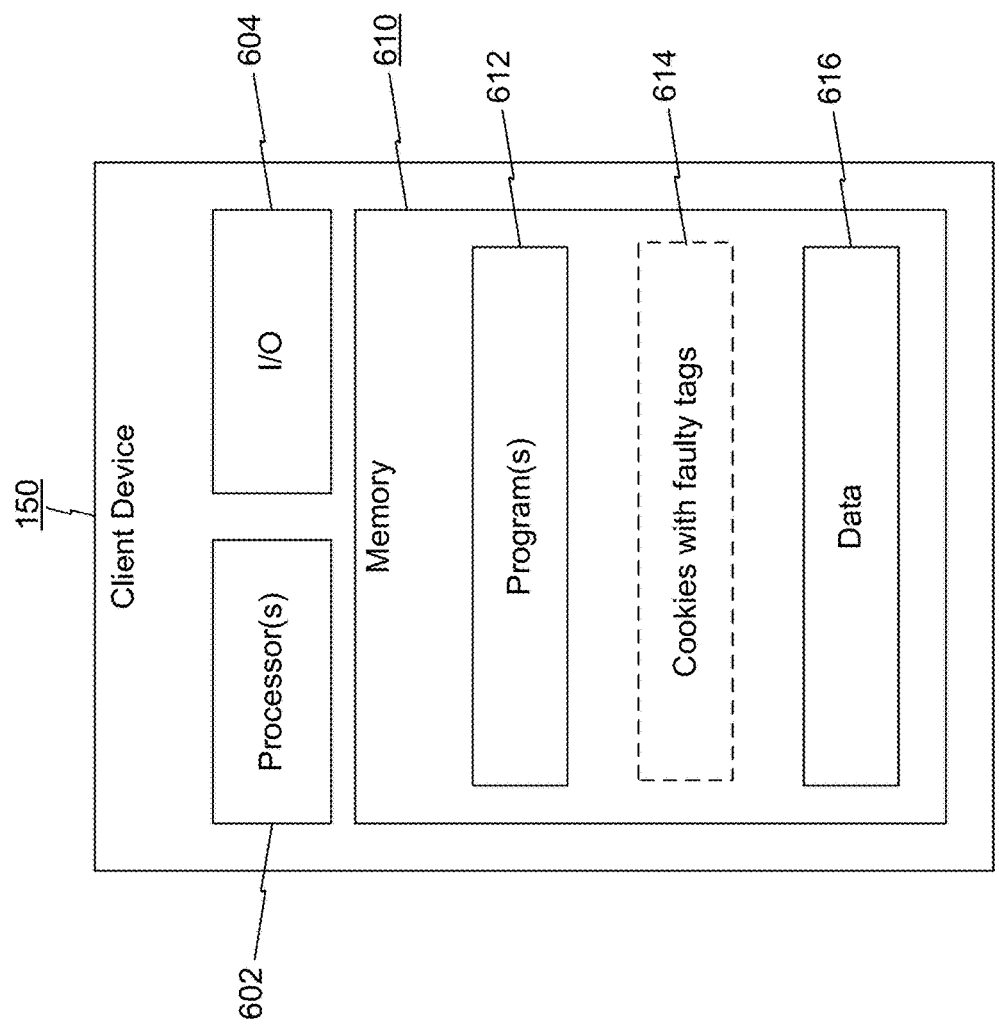
FIG. 6 is a block diagram of an exemplary client device 150, consistent with disclosed embodiments.

FIG. 6 is a block diagram of an exemplary client device 150, consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access website consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform one or more operations when executed by processor 602. The disclosed embodiments are not limited to separate programs or computers configured to perform dedicated tasks. For example, memory 610 may include a single program 612 that performs the functions of the client devices 150, or program 612 may comprise multiple programs. Memory 510 may also store data 314 that is used by one or more programs 612.

In certain embodiments, memory 610 may store a log page tags of websites client devices 150 has visited. In some embodiments master server 160 may request logs of faulty tags to include them in, for example, supervisor benchmark record 326 or local benchmark record 226. In other embodiments, memory 610 may include cookies with faulty tags 614. For example, memory 610 in client device 150 may include a record of persistent cookies that store warning messages. In such embodiments, the cookies may include an expiration date. In such embodiments, client device 150 may transmit the faulty cookies to master server 160, which may include the faulty cookie information and make adjustments the supervisor benchmark record 326 record or the local benchmark record 226.

I/O devices 604 may include one or more devices configured to allow data to be received and/or transmitted by client devices 150 and to allow client devices 150 to communicate with other machines and devices, such as other components of system 100.

The components of client devices 150 may be implemented in hardware, software, or a combination of both hardware and software, as will be apparent to those skilled in the art.

Figure 7:
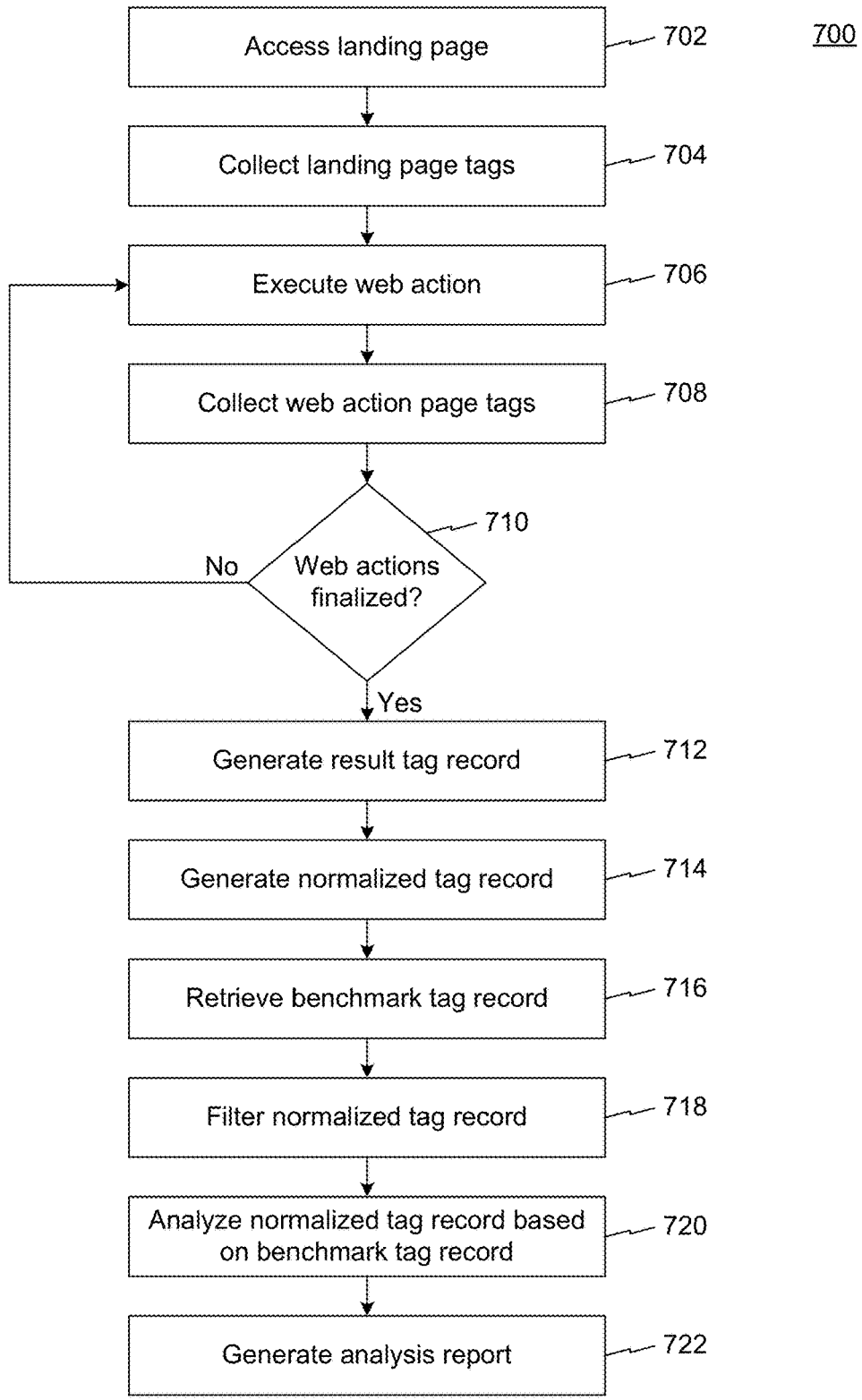
FIG. 7 is an exemplary flow chart illustrating a page tag analysis process, consistent with disclosed embodiments.

FIG. 7 is an exemplary flow chart illustrating a page tag analysis process, consistent with disclosed embodiments. In some embodiments, process 700 may be executed by local subsystem 110 (FIGS. 1 and 2).

Process 700 may be executed when a scenario is compiled at, for example, scenario compiler 236 (FIG. 2). In step 702, local subsystem 110 may access a landing page by, for example, using browser API 240. Local subsystem 110 may additionally execute a series of instructions according a command sequence. In some embodiments, the command sequence may be based on the commands previously disclosed.

In step 704, local subsystem 110 may collect tags associated with the landing page and each one of the testing scenarios. In certain embodiments, local subsystem 110 may be configured to collect a majority of the page tags. However, in other embodiments local subsystem 110 may be configured to collect a group of specific page tags. In yet other embodiments, local subsystem 110 may collect all page tags.

In step 706, local subsystem 110 may execute a command as specified by the command sequence. In certain embodiments the command sequence may be based on a Gherkin. The command may include web actions. For example, the command may include accessing a link or introducing credentials.

In step 708 local subsystem 110 may collect a second set of page tags that are associated with the landing page after the web action has been executed. For example, local subsystem 110 may collect a new set of tags in a different memory space.

In step 710, local subsystem 110 may determine whether the testing scenario has any actions remaining. When the testing scenario has not been completed and additional web actions are remaining in the test scenario, local subsystem 110 may return to step 706 and execute a subsequent web action (step 706) and collect web action page tags (step 708).

However, if in step 710 local subsystem determines that no remaining actions are available, local subsystem may continue to step 712.

In step 712 local subsystem 110 may generate a result tag record. In some embodiments, the result tag record may compile all the collected tags in a single file with a predetermined format. For example, local subsystem may aggregate the tags collected in step 708, and the discussed iterations, to create a result tag record. The result tag record may list all page tags with their associated values.

In step 714, local subsystem 110 may modify the result tag record to generate a normalized tag record. The normalized tag record may modify values associated with the result tag record so they are compatible with data 414 in database 180 or the page tags stored in local benchmark record 226 and supervisor benchmark record 326. For example, if the record tag associated with a loading time is described in milliseconds but the a benchmark tag associated with the loading time is described in seconds, at step 714 local subsystem 110 may generate a normalized tag record by converting the loading time from milliseconds to seconds. Similarly, if the result tag has values that need other transformations, local subsystem 110 may transform the values by generating the normalized tag records.

Generating a normalized tag record may include creating page tag classes that are then used to categorize page tags. This division of tasks may improve the computer efficiency by analyzing similar tags. Page tags may have different types. For example, page tags may relate to images or text. Separating page tags under these categories facilitate later processing by allowing use of specialized software or hardware tailored for each kind of page tag type. For instance, an image processing FPGA may be used to process page tag related to images, while standard processors may be used to analyze page tags associated with text. Therefore, generating a normalized tag record may include determining a plurality of page tag classes according to parameters associated with the page tags; and generating a normalized tag record, in which the normalized tag record comprises normalized elements, normalized elements are modified to tailor with collected elements, and normalized elements are associated with page tag classes values.

Categorization enables the division of tasks to improve the efficiency of the process. For example, generating a numeric search record on a categorized portion of a page tag record may be more efficient than performing the same task with a full set of page tags. By partitioning the data in classes, the conversion processes will be similar and result in a more streamlined and less expensive process. Therefore, once the data is categorized, to generate the normalized tag record, local subsystem 110 or subsystem in system 100 may generate a numeric search record based on the collected tag record, where the numeric search record comprises search elements. The search elements may be representations of the collected tags but formatted in a way that simplify searches. For example, search elements may include a pointer to the collected tag but be only a numeric value that can be sorted. In some embodiments, local subsystem 110 may also sort the search elements, further dividing the search elements into search subgroups, the search subgroups having the same number of search elements; and distributing the search subgroups to a plurality of dedicated processors. This cascading division of page tags into several groups with commonalities significantly improves computer efficiency by improving searching and sorting algorithms and leveraging parallel computing techniques. For example, the use of GPUs for quick operations may be used to efficiently generate the normalized tag records.

In step 716, local subsystem 110 may retrieve a benchmark tag record. For example, local subsystem 110 may query database 180 and request a list of benchmark tag records. In some embodiments, an identification of the benchmark tag records may match the normalized tag records. However, in other embodiments benchmark tag records may be independent from the normalized tag record.

In step 718, local subsystem 110 may filter the normalized tag record based on the benchmark tag record. For example, local subsystem may compare the normalized tag record and the benchmark tag record and filter the normalized tag record by eliminating page tags that are not in the benchmark tag record. In other embodiments, the filtering process may be based on intrinsic characteristics of the tags. For example, a user may select to filter all tags that have no change.

To improve the efficiency of the filtering process, instruments that are particularly programmed to filter elements may be employed for processing the page tags. For example, a field-programmable gate array (FPGA) may be configured to receive the collected tag record and the benchmark tag record; and return a filtered tag record having only matching elements that appear in both the collected tag record and the benchmark tag record.

In step 720, local subsystem 110 may analyze the normalized tag record based on the benchmark tag record. For example, local subsystem 110 may compare values of tags having the same tag ID. The analysis of step 720 may include labeling or flagging tag records that match or do not match the value of the benchmark tag. For example, local subsystem 110 may generate a table with tags of matching records and a second table with tags with non-matching tag records. In addition, in step 720 local subsystem 110 may categorize tags based on priority. For example, local subsystem may divide tags in high, medium, and lower priority.

In step 722, local subsystem 110 may generate a result. For example, local processor 230 may instruct report generator 238 to generate a record based on the analysis. In certain embodiments the record generator may generate a single reporting file with a binary classification of tags. In other embodiments record generator may output an analysis score.

The result generated in step 722 may be used by supervisor subsystem 130 to generate keys that allow the implementation of changes in master server 160. For example, local subsystem 110 may communicate a result tag record, which includes the result of the analysis between normalized tag record and benchmark tag records, and generate a test record for a supervisor subsystem 130. Local subsystem 110 may then request, from supervisor subsystem 130, an authorization to implement a website feature. Based on the results that are obtained, supervisor subsystem 130 may then grant a key or sent an error message. For example, supervisor subsystem may interpret the test record and determine if it is acceptable to implement changes. That is, the results in the test record may provide information on whether the website feature that local subsystem 110 is attempting to implement has a clear record based on the identified page tags. When supervisor subsystem 130 determines that the test record is acceptable, it may transmit, to master server 160 the implementation of the new website feature. Alternatively, supervisor subsystem 130 may send a key to local subsystem 110. The key may grant access to master server 160 to implement the changes. The use of a key to grant access guarantees that supervisor subsystem 130 has control over the changes applied to the master server, but at the same time provides flexibility to enable other subsystems to perform the changes to prevent overloading of supervisor subsystem 130.

In some embodiments, supervisor subsystem 130 may be configured to generate a second result tag record, the second result tag record indicating matches and mismatches between the benchmark tag record and the collected tag record. This operation may facilitate the decision of supervisor subsystem to grant or deny a key for changes creating a simpler evaluation. For example, the second result tag record may simply record a Boolean variable for matches an mismatches and grant access when adding the Boolean variables overcomes a predefined threshold.

Further, in embodiments in which supervisor system 130 may generate keys to enable implementation of changes, the key may be generated to modify specific portions of the website. For example, source code of the website may be compartmentalized in multiple functions. Thus, local subsystem 110 may further configured to request, from supervisor subsystem 130, a feature key specific for the targeted function. For example, if the website feature that will be implemented changes the password feature, local subsystem 110 may request a feature key for the password function. Supervisor subsystem 130 may be configured to generate the feature key. In some embodiments, the feature key may only be generated when report analyzer 340 determines that the result tag record passed a management test. The management test may include no changes in previous tags, or no changes in critical tags that were previously recorded.

Figure 8:
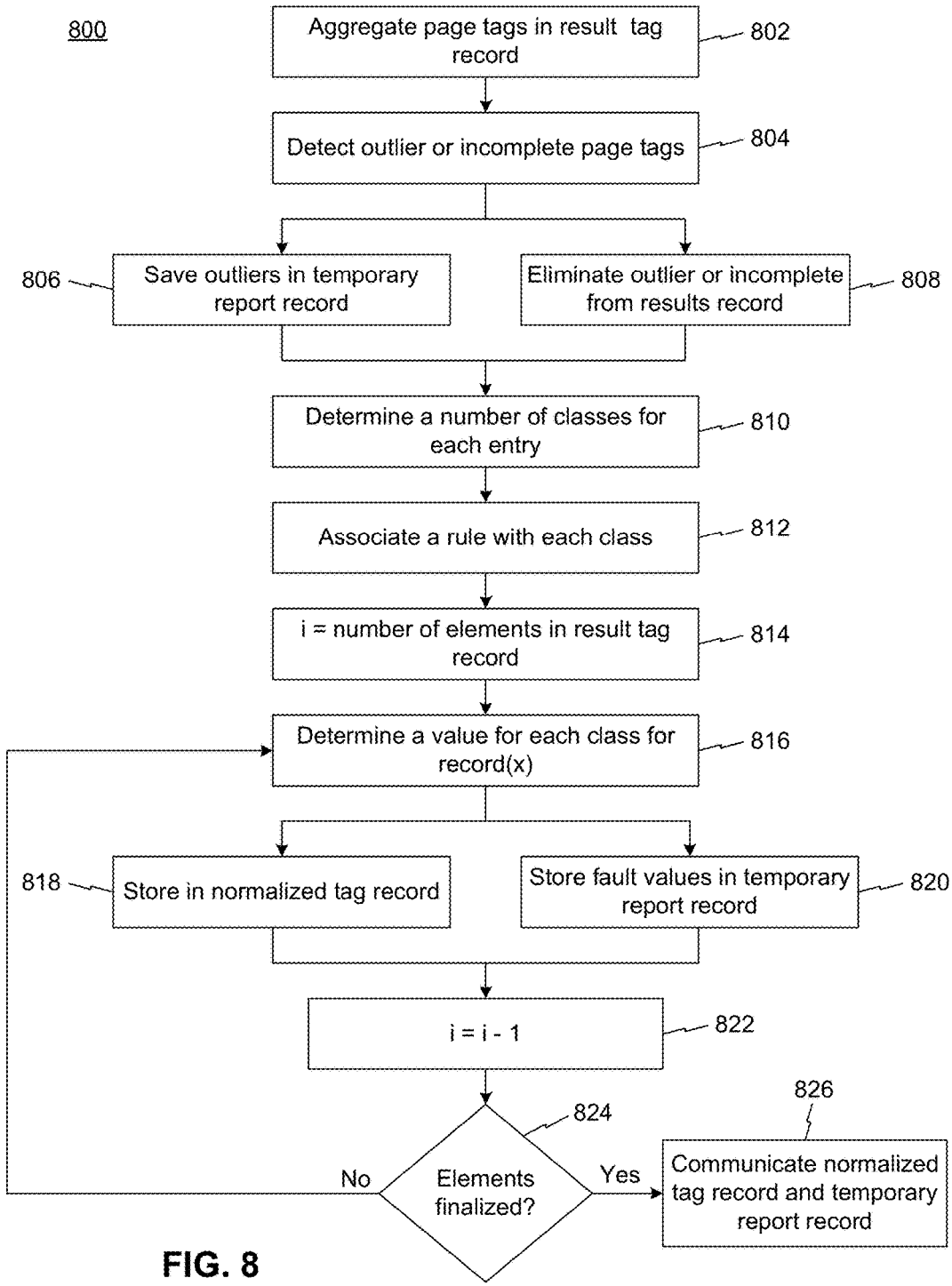
FIG. 8 is an exemplary flow chart illustrating a page tag normalization process, consistent with disclosed embodiments.

FIG. 8 is an exemplary flow chart illustrating a page tag normalization process, consistent with disclosed embodiments. Result tag generation process 800 may be carried out by local subsystem 110. In some embodiments the steps described in process 800 may also be implemented during process 700, for example, at step 712.

In step 802, local subsystem 110 may receive a collection of tags and receive instruction to start aggregating page tags to generate a results page tag.

In step 804, local subsystem may detect outlier or incomplete page tags. For example, local subsystem 110 may execute an outlier detection process with values outside an expected range to delete them from the aggregated list. In such embodiments, the deleted tags with outlier values may be recorded in a failed list.

In steps 806 and 808, local subsystem 110 may process the collected tags by saving outliers in temporary report records or eliminate outliers or incomplete results from the results record.

In step 810, local subsystem 110 may determine a number of classes for each entry. For example, local subsystem 110 may divide the total number of tags in a group of classes. In other embodiments local subsystem 110 may determine classes based on a tag category. For example, local subsystem may determine tags based on binary, integer, character, associated values. In other embodiments, however, the classes may be determined based on a priority of tags.

In step 812, local subsystem 110 may associate a rule with each class. For example, local subsystem 110 may associate integer page tags with a minimum value and determine a result based on the page tag value for a category that is related to an integer value.

In step 814, local subsystem 110 may determine a number of elements for the name tags and associate the number to a temporary variable.

In step 816, local subsystem 110 may determine a value for each one of the records for in the results record. For example, local subsystem 110 may, associate a binary value with the record, depending on the number rule and the value associated with the tag.

In steps 818 and 820, local subsystem 110 may generate two records based on the determinations of step 816. In step 818, local subsystem 110 may store fault values in a temporary record. In step 820, local subsystem 110 may store fault values in a temporary record.

In step 822, local subsystem may modify the a temporary value to continue the iterations.

In step 824, local subsystem 110 may determine whether additional elements are present in the collected tags. When local subsystem 110 determines that the elements in the collected tag record have not been finalized (step 824: no), local subsystem 110 may return to step 816 to continue determinations for each class and storing in normalized tag records or in a temporary report. However, if local subsystem 110 determines that the elements in the collected tag record have been finalized (step 824: yes), local subsystem 110 may communicate normalized tag record and temperature report record at step 826.

Figure 9:
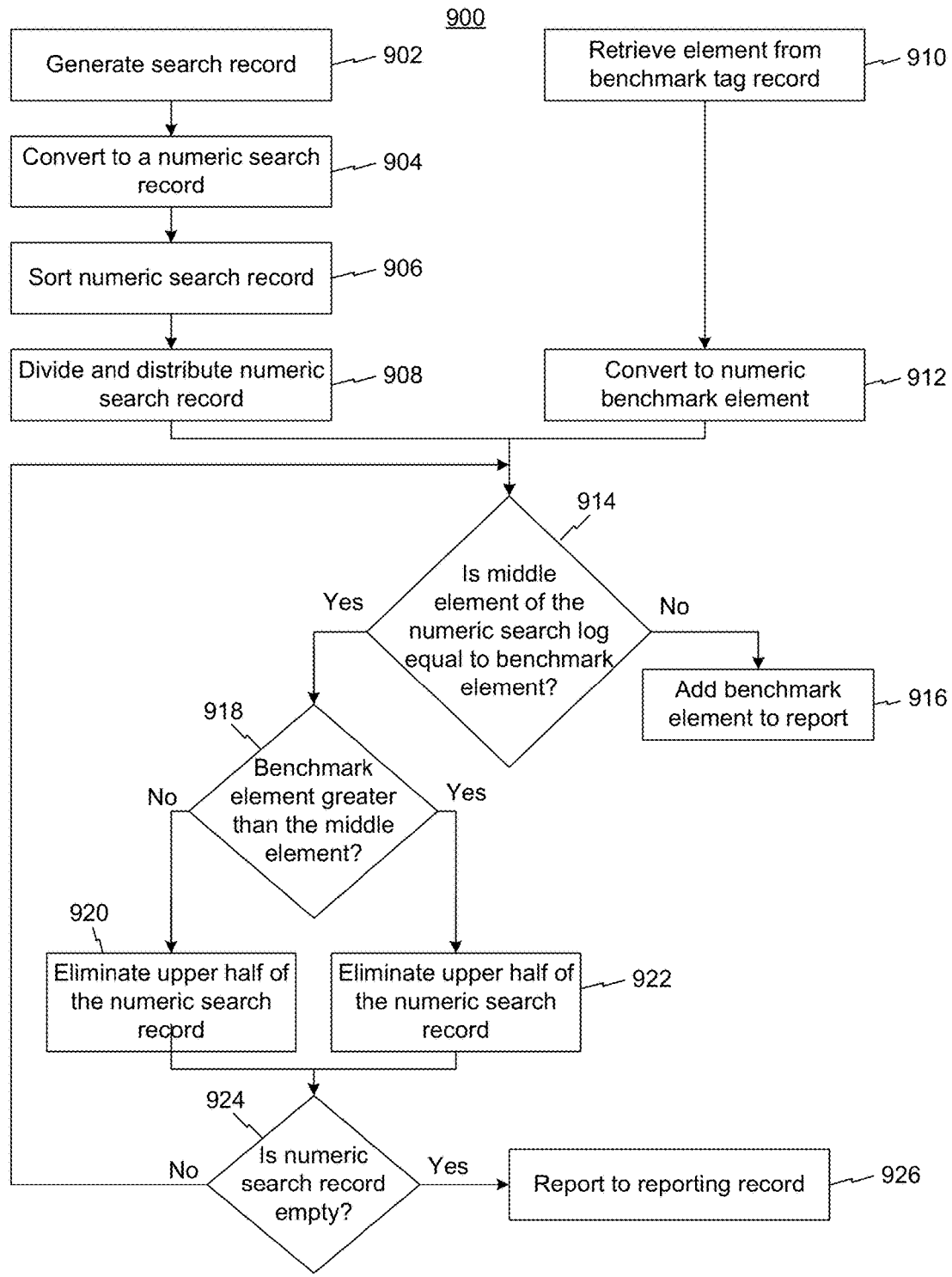
FIG. 9 is an exemplary flow chart illustrating a page tag searching process, consistent with disclosed embodiments.

FIG. 9 is an exemplary flow chart illustrating a page tag searching process, consistent with disclosed embodiments. In some embodiments, local subsystem 110 may carry out searching process 900.

In step 902, local subsystem 110 may generate a search record. In some embodiments, local subsystem 110 may generate a search record by copying a complete in a new vector. For example, local subsystem 110 may copy a results record, a collected record, or a normalized record. In other embodiments, local subsystem 110 may generate the search record based on a primary record, but without copying the full record. For example, local subsystem 110 may generate a sorting record with only tag identifiers, without values, or with only values, and not tag identifiers.

In step 904, local subsystem 110 may generate a numeric search record. The numeric search record may be generated by modifying the record tag record. For example, the numeric record may be created by converting character variables, such as an identifier, to a number. Given the large amount of records too be sorted, the conversion process may be done with algorithms that improve the computer functionality by reducing the number of cycles required to perform the conversion. For example, algorithms such as char2num may be performed by local processor to modify the search record into a numeric search record. This practice improves the computer functioning by reducing the amount of memory dedicated to store the record and simplify comparative searches by comparing numbers rather than characters. If a variable contains integer data which will not necessarily be used in any calculations, it is preferable to save it as a variable of type numeric rather than a variable of type character, even if there is no intention of performing algebraic calculations using the variable. For example, a nominal variable is preferable to store as a numeric variable with an appropriate format rather than a character variable. It is preferable to use numeric variables whenever possible, since this eliminates the need to consider leading and trailing blanks when making comparisons. In addition, a pointer variable may be associated to the search records to maintain a relationship table between the numeric record and the search record, which can be easily correlated with the numeric record.

In step 906, local subsystem 110 may sort the numeric search record. While the sorting process may be done using local processor 230 configured with sorting software, to minimize waiting times it may be done with hardware that is specially configured to sort records. For example, an FPGA may receive and have an arrangement to quickly categorize the record.

In step 908, local subsystem 110 may divide the sorted numeric record in multiple records with different ranges.

In step 910, local subsystem 110 may retrieve a selected element from the benchmark tag record that will be searched in the search record.

In step 912, local subsystem 110 may generate a numeric benchmark element by converting the identity of the benchmark element to a numeric value. Similar processes and/or hardware that is used in step 904 to generate the numeric search record may be used to generate the numeric benchmark element.

In step 914, local subsystem 110 may determine whether the middle element of the sorted numeric record is equal to the numeric benchmark element. If the benchmark element is equal to the middle of the sorted numeric record (step 914: yes), local subsystem 110 may add benchmark element to a report. However, if the benchmark element is not equal to the middle of the sorted numeric record (Step 914: no), local subsystem 110 may continue to step 918 and determined whether the benchmark element is greater than the middle element.

When local subsystem 110 determines the benchmark element is greater than the middle element (step 918: yes), local subsystem 110 may continue to step 922 an eliminate the upper half of the numeric search. However, if local subsystem 110 determines the benchmark element is not greater than the middle element (step 918: no), local subsystem 110 may continue to step 920 and eliminate the lower half of the numeric search.

In step 924, local subsystem 110 may determine whether the numeric search record is empty. When local subsystem 110 determines the numeric search record is not empty it may return to step 914 and evaluate the middle element of the new search record, which has only half the number of elements than the one that started in the previous step, and continue the search for the benchmark element in the search record. However, if local subsystem 110 determines that the numeric search record is empty, (step 924: yes), local subsystem 110 may conclude that the benchmark element is not present in the search record and, in step 926, report that the benchmark element is not in the search record.

Figure 10:
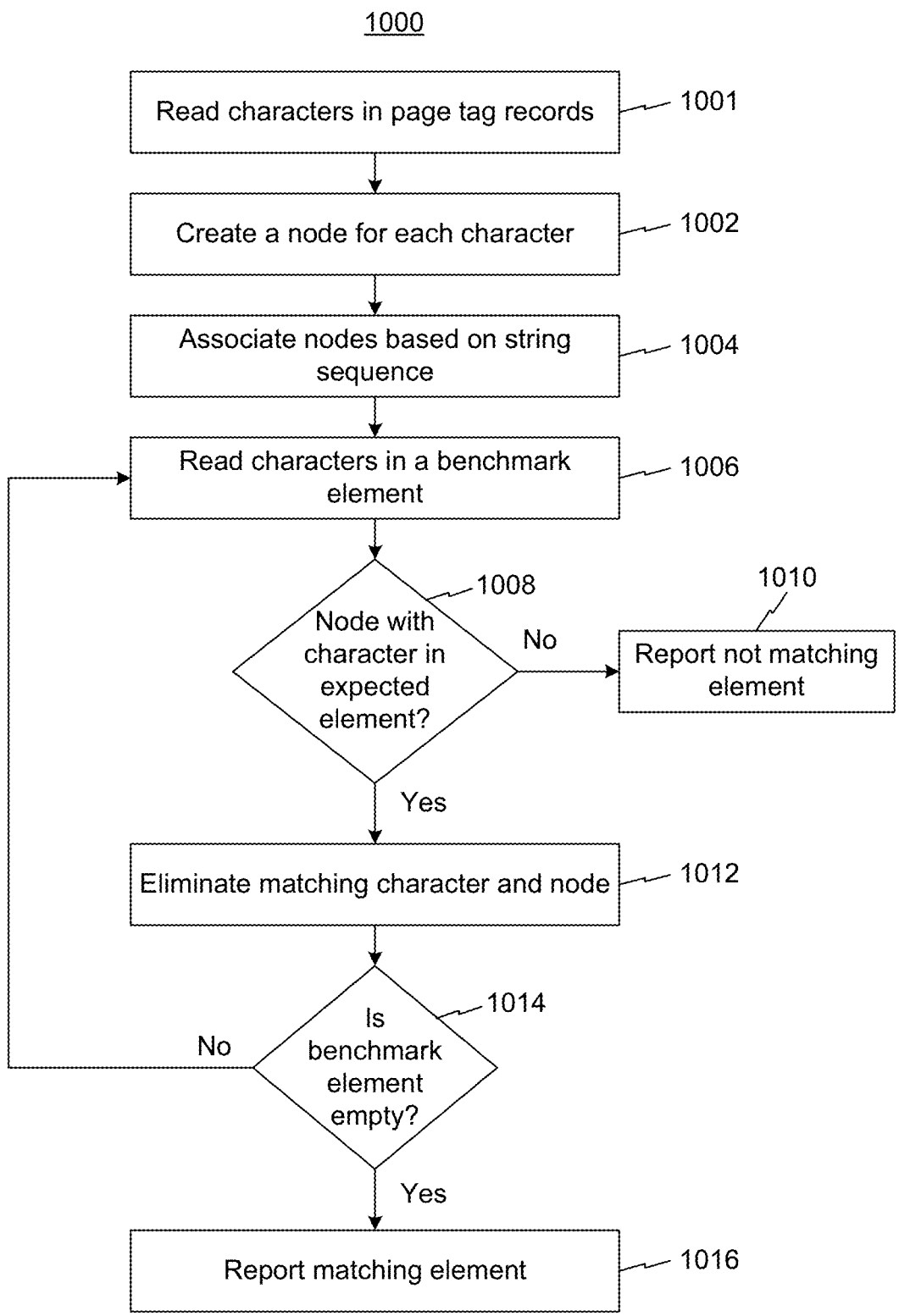
FIG. 10 is an exemplary flow chart illustrating a character-based search process for determining presence of an element in a record.

FIG. 10 is an exemplary character-based search process for determining presence of an element in a record. In some embodiments, the character-based process search may be performed by local subsystem 110. The character-based process may be used to determine whether a page tag is present in a group of page tags improving the search speed. For example, by doing a character-by-character analysis, records can be easily parsed and search routines can be efficiently programmed.

In step 1001, local subsystem 110 may read all characters in a normalized tag record. For example, if the normalized tag record includes the following three tags: (i) PAGE, (ii) TIME, and (iii) REPORT, local subsystem 110 may read all files and create the following exemplary string "PAGETIMEREPORT."

In step 1002, local subsystem 110 may create a node for each character in the file, and, in step 1004, associate nodes based on a string sequence. For example, with the exemplary string described in the previous paragraph, local subsystem 110 may associate P and A with a weighting of one since they are consecutive in one instance. However, in the same example, E and R may be associated with a weighting of 2 since there are two connections between an E and an R. Creating nodes and connections based on a string, results in a character decision tree that can be used to compare whether an element shares the same characters to the string in the order that is determined by the string.

In step 1006, local subsystem 110 may read characters in a benchmark element to analyze with the character decision tree. In some embodiments local subsystem 110 may generate a string for the benchmark. For example, if the benchmark includes numeric values that are not represent with characters, local subsystem 110 may truncate non-character values before comparing with the character decision tree.

In step 1008, local subsystem 110 may determine if there is a node with a character in the expected element. If there are no nodes with the first character of the benchmark element (step 1008: no), then local subsystem 110 may report there is no matching element continuing to step 1010, in which local subsystem 110 reports there are no matching elements. However, if step 1008 determines that there is a node with the first character of the benchmark element (step 1008: yes), then local subsystem 110 may continue to step 1012, eliminate the matching node (step 1012), and continue to step 1014.

In step 1014, local subsystem 110 determines whether there are at least two elements in the benchmark element. If there are less than two elements, local subsystem 110 may conclude that all elements in the benchmark element have been matched with elements in the decision tree and that the benchmark element is empty, and continue to step 1016, in which local subsystem 110 may report the benchmark element is present in the normalized tag record. However, when local subsystem 110 determines the benchmark element is not empty, it may eliminate the character that was matched with the decision tree (step 1020) and then return to step 1006 to read a following character in the benchmark element at step 1006.

The character search of a benchmark page tag in the normalized page tag record may improve the efficiency of the system and increase the speed of records.

Figure 11:
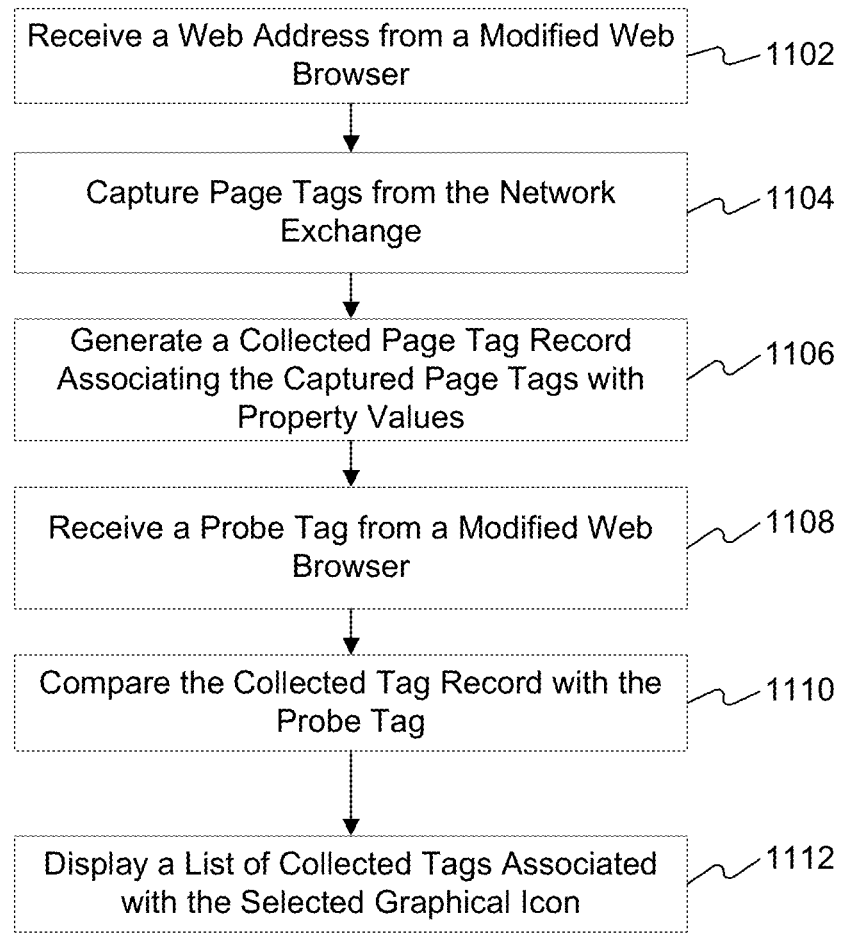
FIG. 11 is an exemplary flow chart illustrating a page tag analysis process implemented with a modified web browser, consistent with disclosed embodiments.

FIG. 11 is an exemplary flow chart illustrating a page tag analysis process implemented with a modified web browser, consistent with disclosed embodiments. Process 1100 may be implemented by local subsystem 110. However, other components of system 100, such as supervisor subsystem 130 may also implement process 1100.

In step 1102, local subsystem 110 may receive a web address from a modified web address. In some embodiments, local subsystem 110 implements and displays the modified web browser. However, in other embodiments, the modified web browser may be implemented in a different subsystem, such as mobile subsystem 120.

The modified web browser may be a regular web browser, such as Google Chrome™, Mozilla Firefox™, Microsoft Edge™, Opera™, Apple Safari™, SeaMonkey™, Pale Moon™, etc., which is configured to implement tasks associated with process 1100. For example, the modified web browser may include an extension that facilitates collection and screening of page tags. The extensions may include plugins that use Java Script Object Notation (JSON) format to define certain properties, embedded Javascript functions, and HTML modules that display controls associated with the extension. The extension may implement the following functions: (i) function beforeRequest(req_details)—Get the data before web-analytics event is executed; (ii) function beforeSendHeaders(req_details)—Configure headers before sending web-analytics event; (iii) function headersReceived (req_details)—Headers received from web-analytics event; (iv) function completed(req_details)—Finished capturing web-analytics event data; (v) function errorOccurred(req_details)—Error occurred in web-analytics event; (vi) function setIcon(active)—Set the icon to required icon.

Receiving the web address may include accessing the website associated with the web address via the modified web browser. In such embodiments, local subsystem 110 may determine whether the web address is a fully qualified address. A fully qualified address may include several parts such as a hostname, a domain name, and an extension (also known as top-level domain). For example, the fully qualified address may be "example.organization.com," where the host name "example" is followed by the domain "organization.com." Local subsystem 110 may employ a plurality of processes and functions to determine whether the web address is fully qualified. For example, local subsystem 110 may apply an address test function.

When the address in not a fully qualified address local subsystem 110 may convert the given address by dividing it in the three sections of first subdomain, second subdomain, and top-level-domain, organized in that order.

In step 1104, local subsystem 110 may capture page tags of the website associated with the web address received from the modified we browser. In some embodiments, local subsystem 110 may use a capturing module to capture the page tags. In some embodiments, the capturing module may be implemented with network analyzer 190. For example, local subsystem 110 may use network analyzer 190 to capture all packets exchanged via network 170 and the use the extension of the modified web browser to identify or select page tags. In other embodiments, capturing module may be implemented within the modified web browser. For example, a metadata file in JSON format containing properties like extension's name, description, and version number may be used to declare a web browser extension and provide permissions. Then, the metadata file may be configured to capture the page tags every time the web browsers accesses a website. In yet other embodiments, network analyzer 190 may both collect packets exchanged with network 170 and filter the packets to identify page tags. In addition, in step 1104, local subsystem 110 may also create a vector with captured tags.

In step 1106, local subsystem 110 may generate a collected page tag record. The collected page tag record may associate the captured page tags with property values. The property values may be one or more variables that defined the page tag. For example, in some embodiments local subsystem 110 may configure a plurality of html headers, each header being associated with a page tag, parse the website using the html headers; and determine an error occurred when none of the html headers is found in a source code of the website. Additional processes to generate a collected page tag may include developing an array of collected page tags in a cache memory.

In step 1108, local subsystem 110 may receive a probe tag from the modified web browser. Local subsystem 110 may use the probe tag to assess whether a page tag of interest to the user is present in the captured tags. For example, local subsystem 110 may evaluate whether the element in the collected tag record that is associated with the probe tag has the same or equivalent identification.

In step 1110, local subsystem 110 may compare the collected tag record with the probe tag. Local subsystem 110 may use processes described in connection with FIG. 8 to normalize the collected tag record and the probe tag. In additional or alternative embodiments, local subsystem 110 may sort the collected tag record prior to comparing to facilitate comparisons and minimize exhaustion of computer resources. For example, comparing organized records will enable a faster comparison by for example creating an alphabetical list of elements or to divide search tasks in parallel processors. In some embodiments, the comparison between the probe tag and the collected tag record may be implemented with specialized hardware. For example, the comparison may be done with an FPGA or complex programmable logic device (CPLD) specifically programmed to compare the two data sets.

In step 1112, local subsystem 110 may display a list of collected tags associated with the selected graphical icon. For example, local subsystem 110 may generate a graphical user interface, such as the one described in FIG. 13, that shows a list of collected tags and is associated with a selected icon. The selected icon may represent that the page tag matches the probe tag, that a value is not matching but the identification is matching, or that the page tag is irrelevant for the probe tag specified by the user.

Figure 12:
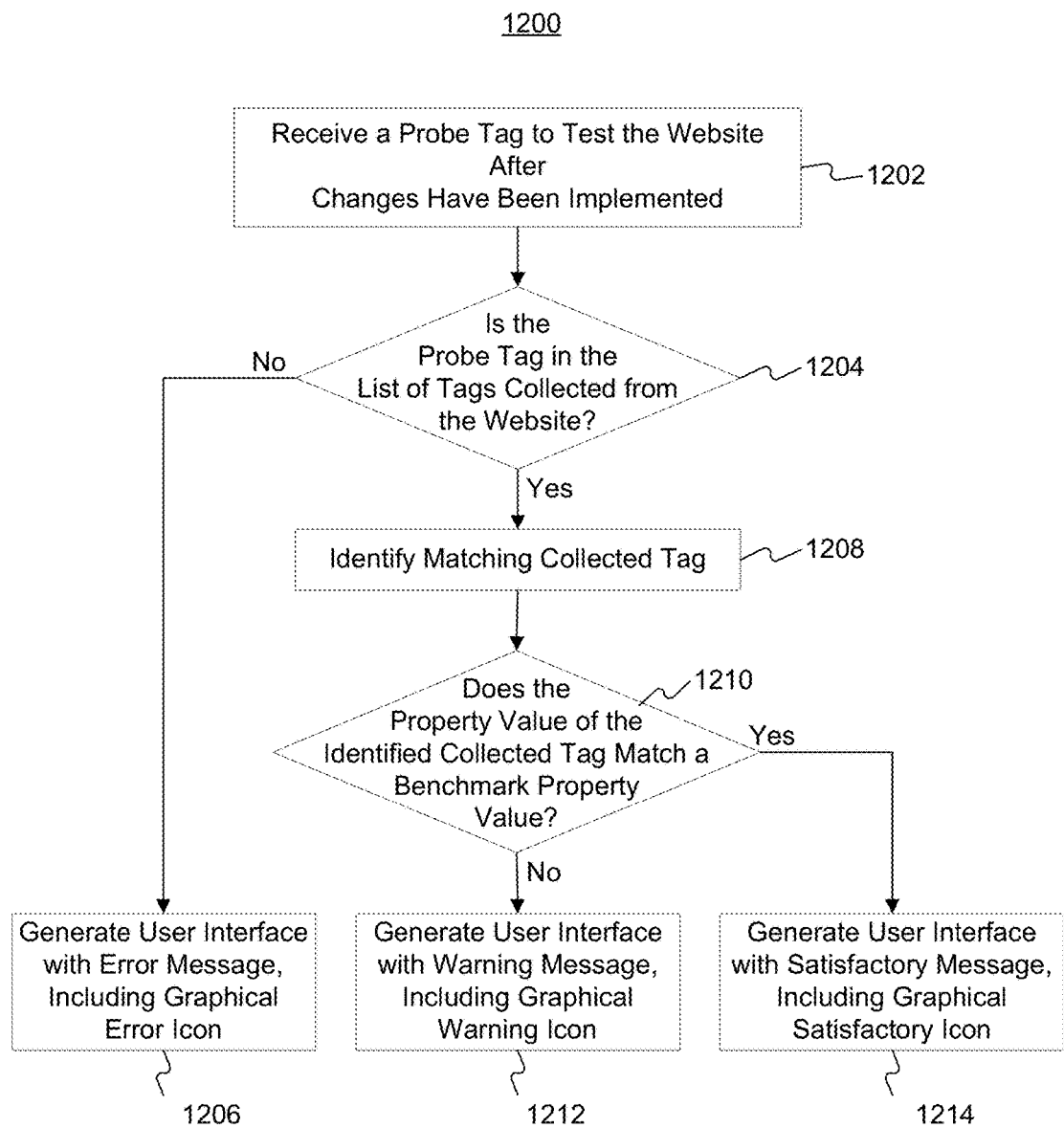
FIG. 12 is an exemplary flow chart illustrating a graphical user interface generation process, consistent with disclosed embodiments.

FIG. 12 is an exemplary flow chart illustrating a graphical user interface generation process, consistent with disclosed embodiments. In some embodiments, process 1200 may be implemented by local processor 230 in local subsystem 110. However, other elements of system 100 may additionally implement process 1200.

Process 1200 may initiate at step 1202, with local subsystem 110 receiving a probe tag for analysis to test the website. In some embodiments, process 1200 may be implemented as a forensic analysis of changes to a website. For example, process 1200 may be executed after changes have been implemented.

In step 1204 local subsystem 110 may determine whether the probe tag for analysis is present in a list of collected tags. For example, local subsystem may implement searching processes, like the ones described in connection with FIGS. 9 and 10, to determine whether the probe tag for analysis is present in a list of collected tags.

In some embodiments, local subsystem 110 may determine whether the probe tag is present by retrieving from database 180 a probe tag property, identifying matches between collected properties and the probe tag property; and generating a uniform resource identifier for each collected tag that is associated with a collected property that matches the probe tag property. The probe tag property may be a value for the probe tag. In many scenarios it is less burdensome to look for a specific value rather than the identifier of a page tag. For example, looking for a numeric value in a list of may be easier than looking for the identification because it would relax requirements of generating a numeric search record (see step 902, FIG. 9). These reductions in steps would improve the computer functionality by minimizing the number of operations that the computer needs to purse. Such improvement may be critical when a very large number of page tags is being analyzed.

When the local subsystem 110 determines the probe tag for analysis is not present in the list of collected tags(step 1204: no), it may continue to step 1206 and generate a user interface with an error message. The user interface may include a graphical error icon that facilitates reading of a report. The user interface may additionally display a reporting pop-up message including the probe tag, the benchmark value associated with the probe tag, and a notification message. However, when the local subsystem 110 determines the probe tag for analysis is present in the list of collected tags (step 1204: yes), local subsystem may then identify a matching collected tag in step 1208. In some embodiments, identifying the matching collected tag may include storing the matching tag in a cache memory or creating a vector with information associated with the collected tag.

In step 1210, local subsystem 110 may determine whether the property value of the identified collected tag matches a benchmark property value. For example, in step 1210 local subsystem 110 may retrieve benchmark property values from local benchmark record 226 to determine whether the probe tag value is equivalent to a benchmark value. In other embodiments, however, local subsystem may request benchmark values from database 180.

When local subsystem 110 determines the property value does not match the benchmarked property value (step 1210: no), it may continue to step 1212 and generate a user interface with a graphical warning icon. However, if local subsystem 110 determines the property value matches a benchmark value (step 1210: yes), then local subsystem 110 may continue to step 1214 and generate a user interface with a satisfactory icon. In some embodiments, the use of specific user interfaces described for process 1200, based on matching tags and matching values, improves the computer functionality by creating specific icons for different tags and values. Instead of creating multiple icons for a plurality of elements, which may stress computer resources, the process 1200 creates independent icons.

Figure 13:
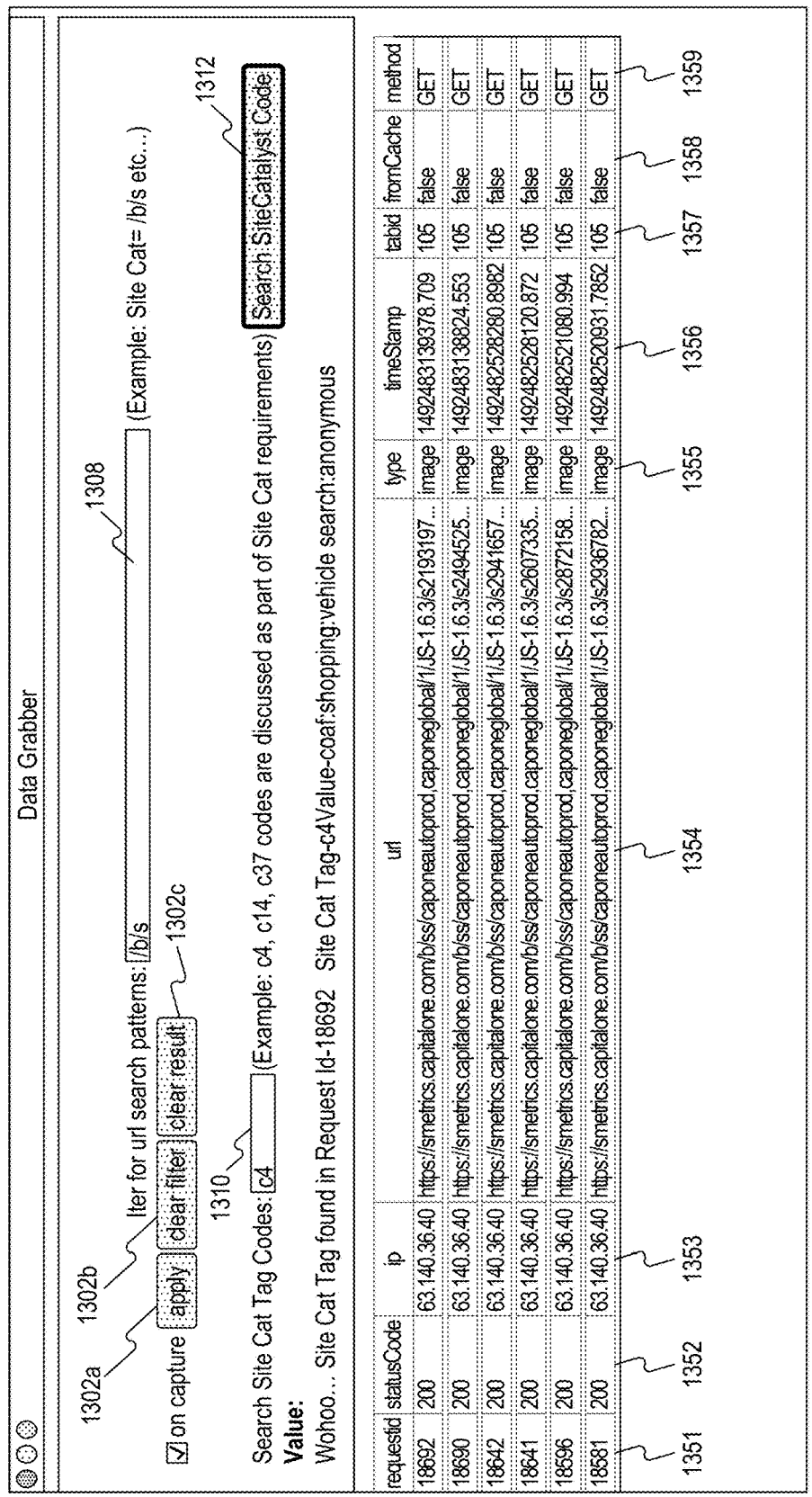
FIG. 13 is an exemplary graphical user interface, consistent with disclosed embodiments.

FIG. 13 is an exemplary graphical user interface 1300, consistent with disclosed embodiments. Graphical user interface 1300 may represent a "Data Grabber" input that is used to execute the process described in FIG. 11. Graphical user interface 1300 may include filtering buttons 1302, a search bar 1308, a catalog input 1310, and a catalog button 1312. In addition, graphical user interface 1300 may include a report table 1350 which may include fields for request identification 1351, status code 1352, address 1353, resource locator 1355, time stamp 1356, tab id 1357, cached value 1358, and acquisition method 1359.

In some embodiments, filtering buttons 1302 may use information in 1308 to modified the elements displayed in the report table 1350. In additional or alternative embodiments, catalog button 1312 may use information in catalog input 1310 to modify the elements displayed in the report table 1350.

Report table 1350 may be a coded list, in which each one of the elements is associated with a graphical icon. The selection of the associated graphical icon may be based on one of the fields for each element in the table. For example, the graphical icon may include a color font for the element. Thus, an element with type image may highlighted with a red color while an element of report table 1350 with type text may have a blue color. Other icons such as warning signs, error signs, or check signs may also be associated with each element in a coded list.

In some embodiments, the request identification may include a serial number. For example, the request id may be a consecutive number of requests recorded during a session.

In some embodiments, the status code 1352 may include a Hypertext Transfer Protocol (HTTP) response status codes. For example, status code 1352 may include:

| Code type | Sample Code |
|---|---|
| 1xx Informational | 100 Continue |
| | 101 Switching Protocols |
| | 102 Processing; (WebDAV) |
| 2xx Success | 200 OK; |
| | 201 Created; |

-continued

| Code type | Sample Code |
|---|---|
| | 202 Accepted; |
| | 203 Non-Authoritative Information; |
| | 204 No Content; |
| | 205 Reset Content; |
| | 206 Partial Content; |
| | 207 Multi-Status (WebDAV); |
| | 208 Already Reported (WebDAV); |
| | 226 IM Used; |
| 3xx Redirection | 300 Multiple Choices |
| | 301 Moved Permanently; |
| | 302 Found; |
| | 303 See Other; |
| | 304 Not Modified; |
| | 305 Use Proxy; |
| | 306 (Unused); |
| | 307 Temporary Redirect; |
| | 308 Permanent Redirect (experimental) |
| 4xx Client Error | 400 Bad Request, |
| | 401 Unauthorized, |
| | 402 Payment Required, |
| | 403 Forbidden, |
| | 404 Not Found, |
| | 405 Method Not Allowed, |
| | 406 Not Acceptable, |
| | 407 Proxy Authentication Required, |
| | 408 Request Timeout, |
| | 409 Conflict, |
| | 410 Gone, |
| | 411 Length Required, |
| | 412 Precondition Failed, |
| | 413 Request Entity Too Large, |
| | 414 Request-URI Too Long, |
| | 415 Unsupported Media Type, |
| | 416 Requested Range Not Satisfiable, |
| | 417 Expectation Failed, |
| | 422 Unprocessable Entity (WebDAV), |
| | 423 Locked (WebDAV), |
| | 424 Failed Dependency (WebDAV), |
| | 425 Reserved for WebDAV, |
| | 426 Upgrade Required, |
| | 428 Precondition Required, |
| | 429 Too Many Requests, |
| | 431 Request Header Fields Too Large, |
| | 444 No Response (Nginx), |
| | 449 Retry With (Microsoft), |
| | 450 Blocked by Windows Parental Controls (Microsoft), |
| | 451 Unavailable For Legal Reasons, |
| | 499 Client Closed Request (Nginx) |
| 5xx Server Error: | 500 Internal Server Error, |
| | 501 Not Implemented, |
| | 502 Bad Gateway, |
| | 503 Service Unavailable, |
| | 504 Gateway Timeout, |
| | 505 HTTP Version Not Supported, |
| | 506 Variant Also Negotiates (Experimental), |
| | 507 Insufficient Storage (WebDAV), |
| | 508 Loop Detected (WebDAV), |
| | 509 Bandwidth Limit Exceeded (Apache), |
| | 510 Not Extended, |
| | 511 Network Authentication Required, |
| | 598 Network read timeout error, |
| | 599 Network connect timeout error. |

The page tag type 1355 may be defined as an image, text, mouse over, click, or session duration. While the page type 1355 is presented as text in the field, in some embodiments the page tag type 1355 may be codified to minimize complexity of the table and save memory. For example, instead of "image" and "text," page type 1355 may be a "1" and "2" representing the image and text to minimize the table weight.

Acquisition method 1359 may include HTTP methods. For example, acquisition method 1359 may include common methods for HTTP such as GET, HEAD, POST, PUT, DELETE, TRACE, CONNECT. The GET method means retrieve whatever information (in the form of an entity) is identified by the Request-URI. If the Request-URI refers to a data-producing process, it is the produced data which shall be returned as the entity in the response and not the source text of the process, unless that text happens to be the output of the process. The HEAD method is identical to GET except that the server MUST NOT return a message-body in the response. The POST method is used to request that the origin server accept the entity enclosed in the request as a new subordinate of the resource identified by the Request-URI in the Request-Line. The PUT method requests that the enclosed entity be stored under the supplied Request-URI. If the Request-URI refers to an already existing resource, the enclosed entity SHOULD be considered as a modified version of the one residing on the origin server.

Figure 14:
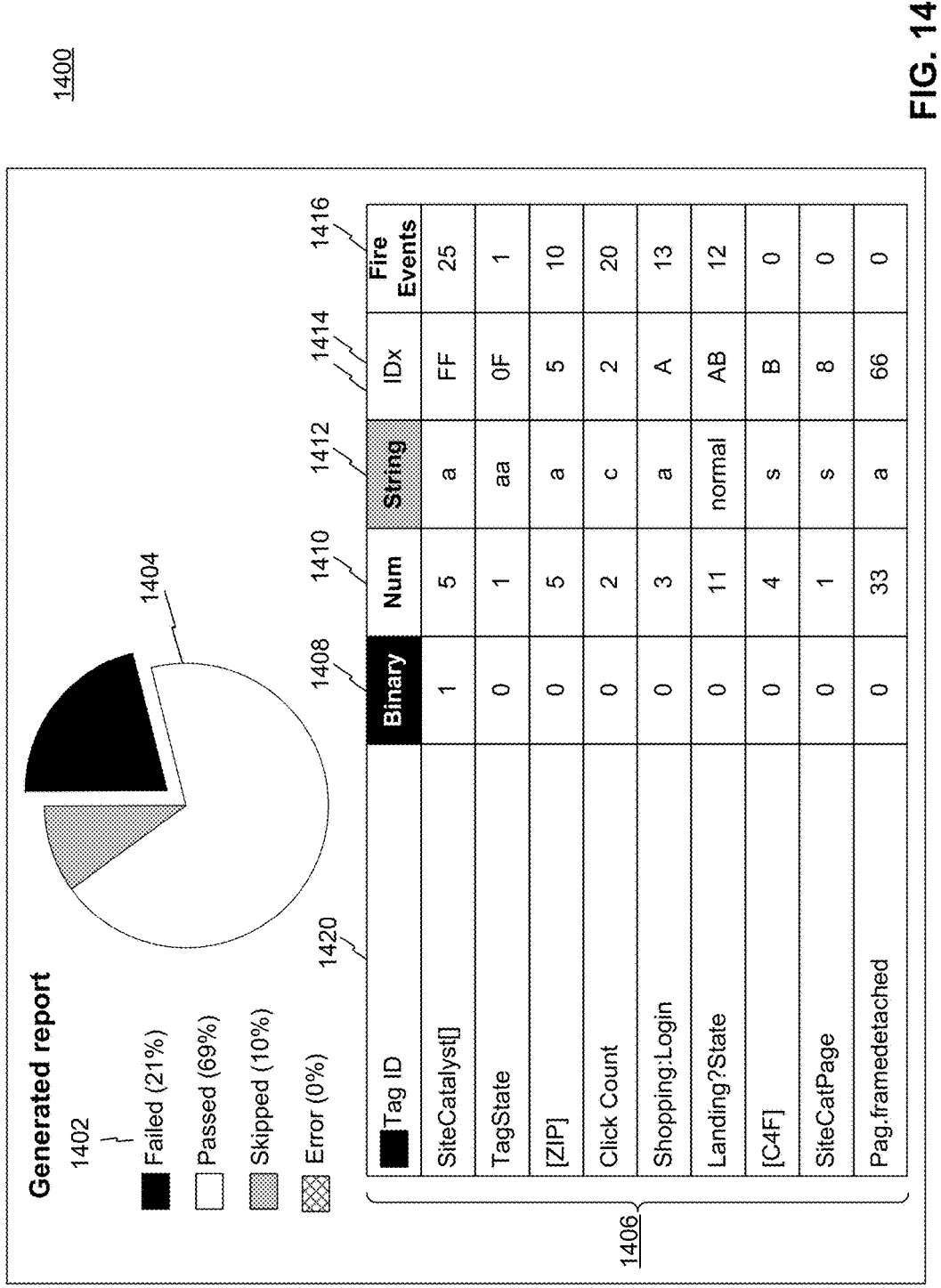
FIG. 14 is a graph of an exemplary page tag report, consistent with disclosed embodiments.

FIG. 14 is an exemplary graphical user interface report 1400, consistent with disclosed embodiments. Local subsystem 110 may generate user interface 1400, for example, at step 722 of FIG. 7. User interface 1400 may be issued by report generator 238.

User interface 1400 may include a summary of matching tags 1402, that may also be summarized with a graphical representation 1404.

User interface 1400 may also include a reporting table 1406. Table 1406 may include a tag ID 1420, a binary result 1408, a numeric result 1410, a string result 1412, and an hexadecimal result 1414. In addition table 1406 may include information of number of "fire events" or number of number of page tag occurrences.

While FIG. 14 presents table 1406 in a graphical user interface, such embodiment may be substituted with only machine-readable tables. For example, when hundreds or thousands of tags are being analyzed, table 1406 may be in the form of a Comma Separated Values (CSV) or Extensible Stylesheet Language Transformations (XSLT) file formatted for machine reading. In addition, as previously explained the table may include certain elements to assure the quality or improve the computer functioning by compressing information.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed remote control system and related methods. Other embodiments will be apparent to those skilled in the art from consideration of the specification and practice of the disclosed remote control system and related methods. It is intended that the specification and examples be considered as exemplary only, with a true scope being indicated by the following claims and their equivalents

What is claimed is:

1. A computer system for analyzing page tags of a website, the system comprising:
   a processor; and
   a storage medium storing instructions that, when executed, configure the processor to:
      receive a web address from a modified web browser, the modified web browser comprising a page tag capturing module;
      access a website associated with the web address via the modified web browser;
      generate a collected page tag record using the page tag capturing module, the collected page tag record including a plurality of collected tags;
      receive, from the modified web browser, a probe tag, the probe tag comprising a probe identification, the probe tag being received from a user of the modified browser;
      determine whether the probe tag is included in the collected page tag record;
      display a coded list comprising the collected tags, the coded list associating collected tags with graphical icons, the graphical icons representing whether collected properties match the probe tag; and
      display a first reporting message when the probe tag is included in the collected page tag record, the first reporting message including an identification of the probe tag and a collected value associated with the probe tag.

2. The computer system of claim 1, wherein the processor is further configured to display a second reporting message when the probe tag is not included in the collected page tag, the second reporting message comprising the identification of the probe tag and the collected value associated with the probe tag.

3. The computer system of claim 1, wherein the coded list comprises:
   a request identification, the request identification comprising a serial number;
   a status code, the status code comprising a Hypertext Transfer Protocol (HTTP) response status code;
   a page tag type, the page tag type being one of image, text, mouse over, click, or session duration;
   a time stamp; and
   an acquisition method, the acquisition method comprising one of GET, POST, HEAD, or TRACE.

4. The computer system of claim 1, wherein to determine whether the probe tag is included in the collected page tag record, the processor is further configured to
   generate a normalized tag record, the normalized tag record comprising the collected tags modified to match a format of the probe tag.

5. The computer system of claim 1, wherein to access the website the processor is further configured to:
   determine whether the web address is a fully qualified address; and
   when the web address is not a fully qualified address, convert the web address by dividing the web address into three sections in sequence, the sections comprising first subdomain, second subdomain, and top-level-domain.

6. The computer system of claim 1, wherein to generate the collected page tag record the processor is further configured to:
   configure a plurality of HTML headers, each header being associated with a page tag;
   parse the website using the HTML headers; and
   determine that an error occurred when none of the HTML headers is found in a source code of the website.

7. The computer system of claim 1, wherein to determine whether the probe tag is included in the collected page tag record, the processor is further configured to filter the collected page tag record using an FPGA configured to eliminate page tags that do not match the probe tag.

8. The computer system of claim 1 wherein:
the processor is in communication with a database; and
to determine whether the probe tag is included in the collected page tag, the processor is further configured to:
retrieve from a database a probe tag property;
identify matches between collected properties and the probe tag property; and
generate a uniform resource identifier for each collected tag that is associated with a collected property that matches the probe tag property.

9. The computer system of claim 1, wherein the page tag capturing module comprises a packet analyzer configured to identify page tags from packets in a TCP/IP communication.

10. A non-transitory computer-readable medium storing instructions that, when executed by a processor, cause the processor to operate a computer system for analyzing page tags of a website by performing operations, the operations comprising:
receiving a web address from a modified web browser, the modified web browser comprising a page tag capturing module;
accessing a website associated with the web address via the modified web browser;
generating a collected page tag record using the page tag capturing module, the collected page tag record comprising a plurality of collected tags associated with collected properties;
receiving, from the modified web browser, a probe tag, the probe tag comprising a probe identification;
determining whether the probe tag is included in the collected page tag record; and
displaying a coded list comprising the collected tags, the coded list associating collected tags with graphical icons, the graphical icons representing whether collected properties match the probe tag,
wherein determining whether the probe tag is included in the collected page tag record comprises generating a normalized tag record, the normalized tag record comprising the collected tags modified to match a format of the probe tag.

11. The non-transitory computer-readable medium of claim 10, wherein:
receiving the probe tag comprises receiving the probe tag from a user of the modified website; and
the instructions further comprise displaying a first reporting message when the probe tag is included in the collected page tag record, the first reporting message including an identification of the probe tag and a collected value associated with the probe tag.

12. The non-transitory computer-readable medium of claim 11, wherein the operations further comprise displaying a second reporting message when the probe tag is not included in the collected page tag, the second reporting message comprising the identification of the probe tag and the collected value associated with the probe tag.

13. The non-transitory computer-readable medium of claim 10, wherein the coded list comprises:
a request identification, the request identification comprising a serial number;
a status code, the status code comprising a Hypertext Transfer Protocol (HTTP) response status code;
a page tag type, the page tag type being one of image, text, mouse over, click, or session duration;
a time stamp; and
an acquisition method, the acquisition method comprising one of GET, POST, HEAD, or TRACE.

14. The non-transitory computer-readable medium of claim 10, wherein accessing the website comprises:
determining whether the web address is a fully qualified address; and
when the address is not a fully qualified address, converting the web address by dividing the address into three section in sequence, the sections comprising first subdomain, second subdomain, and top-level-domain.

15. The non-transitory computer-readable medium of claim 10, wherein generating the collected page tag record comprises:
configuring a plurality of HTML headers, each header being associated with a page tag;
parsing the website using the HTML headers; and
determining that an error has occurred when none of the HTML headers is found in a source code of the website.

16. The non-transitory computer-readable medium of claim 10, wherein determining whether the prove tag is included in the collected page tag record comprises filtering the collected page tag record using an FPGA configured to eliminate page tags that do not match the probe tag.

17. A computer-implemented method for analyzing page tags of a website, the method comprising:
receiving a web address from a modified web browser, the modified web browser comprising a page tag capturing module;
accessing a website associated with the web address via the modified web browser;
generating a collected page tag record using the page tag capturing module, the collected page tag record comprising a plurality of collected tags associated with collected properties;
receiving, from the modified web browser, a probe tag, the probe tag comprising a probe identification;
determining whether the probe tag is included in the collected page tag record; and
displaying a coded list comprising the collected tags, the coded list associating collected tags with graphical icons, the graphical icons representing whether collected properties match the probe tag,
wherein the page tag capturing module comprises a packet analyzer configured to identify page tags from packets in a TCP/IP communication.

* * * * *